(12) United States Patent
Subbarayan et al.

(10) Patent No.: US 10,303,808 B2
(45) Date of Patent: May 28, 2019

(54) PRODUCT CONFIGURATION

(71) Applicant: Configit A/S, Copenhagen (DK)

(72) Inventors: Sathia Moorthy Subbarayan, Chennai (IN); Henrik Reif Andersen, Bagsvaerd (DK)

(73) Assignee: CONFIGIT A/S, Copenhagen (DK)

( * ) Notice: Subject to any disclaimer, the term of this patent is extended or adjusted under 35 U.S.C. 154(b) by 846 days.

(21) Appl. No.: 14/280,494

(22) Filed: May 16, 2014

(65) Prior Publication Data

US 2015/0331974 A1    Nov. 19, 2015

(51) Int. Cl.
*G06F 7/02* (2006.01)
*G06F 17/50* (2006.01)

(52) U.S. Cl.
CPC ........... *G06F 17/50* (2013.01); *G06F 7/02* (2013.01); *G06F 17/5009* (2013.01); *G06F 2217/02* (2013.01); *G06F 2217/06* (2013.01)

(58) Field of Classification Search
CPC ......... G06F 17/50; G06F 7/02; G06F 17/5009
USPC .......................................................... 703/2
See application file for complete search history.

(56) References Cited

U.S. PATENT DOCUMENTS

| | | | | |
|---|---|---|---|---|
| 5,675,784 A * | 10/1997 | Maxwell | ............... | G06Q 10/10 |
| 5,745,765 A * | 4/1998 | Paseman | ............... | G06F 17/50 |
| | | | | 717/107 |
| 5,963,953 A * | 10/1999 | Cram | ............... | G06F 17/50 |
| 5,996,114 A * | 11/1999 | Moeller | ............... | G06N 5/02 |
| | | | | 714/699 |
| 6,192,355 B1 * | 2/2001 | Skovgaard | ............ | G06F 15/177 |
| | | | | 706/46 |
| 7,003,360 B1 * | 2/2006 | Dillon | ............... | G06F 17/50 |
| | | | | 700/103 |
| 7,062,478 B1 * | 6/2006 | Huelsman | ............ | G06Q 10/06 |
| | | | | 706/47 |
| 7,584,079 B2 | 9/2009 | Lichtenberg et al. | | |
| 7,739,080 B1 * | 6/2010 | Beck | ............... | G06F 17/50 |
| | | | | 700/95 |
| 7,987,149 B2 * | 7/2011 | Kulkarni | ............... | G06Q 10/06 |
| | | | | 703/1 |
| 8,019,635 B2 * | 9/2011 | An | ............... | G06Q 10/06312 |
| | | | | 705/22 |

(Continued)

OTHER PUBLICATIONS

Randal E. Bryant ("Symbolic Boolean Manipulation with Ordered Binary Decision Diagrams", Carnegie Mellon University, 1992, pp. 1-36).*

(Continued)

*Primary Examiner* — Kamini S Shah
*Assistant Examiner* — Iftekhar A Khan
(74) *Attorney, Agent, or Firm* — Womble Bond Dickinson (US) LLP

(57) ABSTRACT

Methods, computer systems and computer readable storage mediums for configuring a product based on a product model are provided. The product model has variables and rules. Each variable is associated with a set of values. The rules represent inter-dependencies among the variables and values. The variables and rules define a product configuration problem to be solved. A Decomposable And Or Graph, DAOG, is generated. The DAOG represents the product model. Subsequently, values for the variables of the product model are iteratively set based on the DAOG.

19 Claims, 23 Drawing Sheets

(56) References Cited

U.S. PATENT DOCUMENTS

| | | | | |
|---|---|---|---|---|
| 8,078,489 | B1* | 12/2011 | Marsten | G06Q 10/04 705/7.25 |
| 8,290,822 | B2* | 10/2012 | Gade | G06Q 30/0621 705/26.1 |
| 8,595,171 | B2* | 11/2013 | Qu | G06F 17/50 703/13 |
| 8,762,214 | B1* | 6/2014 | Daniel | G06Q 30/06 705/26.1 |
| 9,524,506 | B2* | 12/2016 | Handorf | G06Q 30/0205 |
| 2002/0107763 | A1* | 8/2002 | Palmer | G06Q 10/0875 705/29 |
| 2002/0158880 | A1* | 10/2002 | Williams | G06T 15/04 345/582 |
| 2002/0165701 | A1* | 11/2002 | Lichtenberg | G06F 17/5095 703/7 |
| 2003/0115559 | A1* | 6/2003 | Sawada | G06F 17/504 716/103 |
| 2003/0220926 | A1* | 11/2003 | Huelsman | G06N 5/02 |
| 2004/0181500 | A1* | 9/2004 | Huelsman | G06Q 10/06 |
| 2004/0260667 | A1* | 12/2004 | Huelsman | G06N 5/025 706/47 |
| 2005/0108183 | A1* | 5/2005 | Huelsman | G06Q 30/02 706/47 |
| 2005/0229124 | A1* | 10/2005 | Farkash | G06F 17/504 716/103 |
| 2006/0212279 | A1* | 9/2006 | Goldberg | G06N 3/126 703/2 |
| 2007/0094204 | A1* | 4/2007 | Huelsman | G06N 5/04 706/47 |
| 2007/0208677 | A1* | 9/2007 | Goldberg | G06N 7/005 706/13 |
| 2008/0086705 | A1* | 4/2008 | Balasubramanian | G06F 8/30 716/103 |
| 2012/0047045 | A1* | 2/2012 | Gopikrishna | G06Q 10/10 705/26.5 |
| 2012/0324414 | A1* | 12/2012 | Tzoref-Brill | G01R 31/31835 716/136 |
| 2013/0091033 | A1* | 4/2013 | Goodman | G06Q 30/0621 705/26.5 |
| 2013/0103983 | A1* | 4/2013 | Tzoref-Brill | G06F 11/3676 714/26 |
| 2014/0173349 | A1* | 6/2014 | Farchi | G06F 11/008 714/37 |
| 2014/0372083 | A1* | 12/2014 | Hsu | G06F 17/5009 703/1 |
| 2015/0094997 | A1* | 4/2015 | Ivrii | G06F 11/3684 703/2 |
| 2015/0120490 | A1* | 4/2015 | Subbarayan | G06Q 30/0621 705/26.5 |
| 2015/0379442 | A1* | 12/2015 | Samanthapudi | G06Q 10/0633 705/7.27 |

OTHER PUBLICATIONS

Euwe et al. ("Configuration of complex products",Elsevier Science Publishers B.V., 1993, pp. 1-11).*
Fargier et al. ("Knowledge Compilation Properties of Trees-of-BDDs, Revisited", IJCAI, 2009, pp. 772-777).*
Steffen Lauritzen ("Decomposition and decomposable graphs" University of Oxford, 2011, pp. 1-34).*
Ng et al. ("A hybrid 'dynamic programming/depth-first search' algorithm, with an application to redundancy allocation",IIE Transactions, 2001, pp. 1-29).*
Frank Pfenning ("Lecture Notes on Binary Decision Diagrams", Lecture Notes, 2010, pp. L 19.1-L 19.15).*
Subbarayan et al. ("Knowledge Compilation Properties of• Tree•of-BDDs", Association for the Advancement of Artificial Intelligence, 2007, pp. 1-6) (Year: 2007).*
Randal E. Bryant ("Symbolic Boolean Manipulation with Ordered Binary Decision Diagrams", Carnegie Mellon University, 1992, pp. 1-36) (Year: 1992).*
European Patent Office Communication enclosing Extended European Search Report for Counterpart European Patent Application No. 14001748.4, 8 pages, (dated Sep. 26, 2014).
Sathiamoorthy Subbarayan, et al., "Knowledge Compilation Properties of Tree-of-BDDs," AAAI Conference, Vancouver, p. 502-507 (2007).
Adnan Darwiche, "Decomposable Negation Normal Form," Journal of the ACM, vol. 48, No. 4, pp. 608-647 (Jul. 2001).
Sathiamoorthy Subbarayan, "Integrating CSP Decomposition Techniques and BDDs for Compiling Configuration Problems," CP-AI-OR Conference, Prague, Springer LNCS 3524, p. 351-368 (2005).
Definition, "Set (Mathematics)," http://en.wikipedia.org/wiki/Set_(mathematics), 8 pgs. (May 4, 2014).
Definition, "Connected Component (graph theory)," http://en.wikipedia.org/wiki/Connected_component_(graph_theory), 3 pgs. (Mar. 28, 2014).

* cited by examiner

| Color | Black | White | Red | Blue |
|---|---|---|---|---|
| Size | Small | Medium | Large | - |
| Print | MIB | STW | - | - |

Fig. 1A        Variables and associated values

| Print | Color |
|---|---|
| MIB | Black |
| STW | White |
| STW | Black |
| STW | Red |
| STW | Blue |

| Print | Size |
|---|---|
| MIB | Small |
| MIB | Medium |
| MIB | Large |
| STW | Medium |
| STW | Large |

Fig. 1B        Rule 1 ($b_1$):                                    Rule 2 ($b_2$)

| Color | Size | Print |
|---|---|---|
| Black | Small | MIB |
| Black | Medium | MIB |
| Black | Large | MIB |
| Black | Medium | STW |
| Black | Large | STW |
| White | Medium | STW |
| White | Large | STW |
| Red | Medium | STW |
| Red | Large | STW |
| Blue | Medium | STW |
| Blue | Large | STW |

Fig. 1C        Solution space (11 solutions)

| Color | Bit 0 | Bit 1 |
|---|---|---|
| Black | False | False |
| White | False | True |
| Red | True | False |
| Blue | True | True |

Fig. 5A

| Size | Bit 2 | Bit 3 |
|---|---|---|
| Small | False | False |
| Medium | False | True |
| Large | True | False |

Fig. 5B

| Print | Bit 4 |
|---|---|
| MIB | False |
| STW | True |

Fig. 5C

| A | B | C | D | E | F |
|---|---|---|---|---|---|
| 3 | 1 | 3 | 1 | 1 | 1 |
| 5 | 1 | 1 | 1 | 1 | 1 |
Fig. 12A
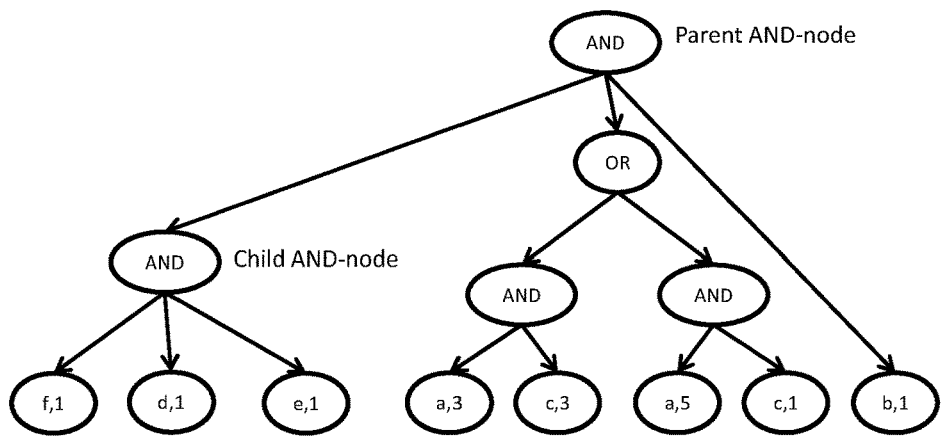
Fig. 12B
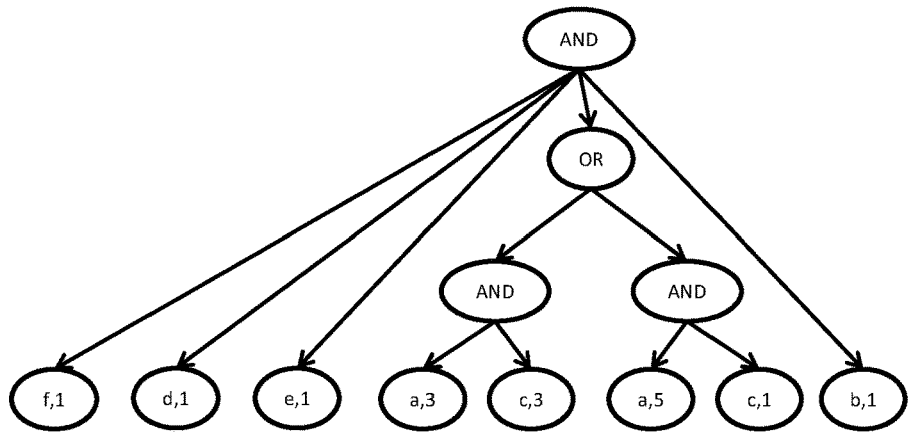
Fig. 12C

| A | B | C | D | E | F |
|---|---|---|---|---|---|
| 3 | 1 | 3 | 1 | 1 | 1 |
| 5 | 1 | 1 | 1 | 1 | 1 |
Fig. 13A
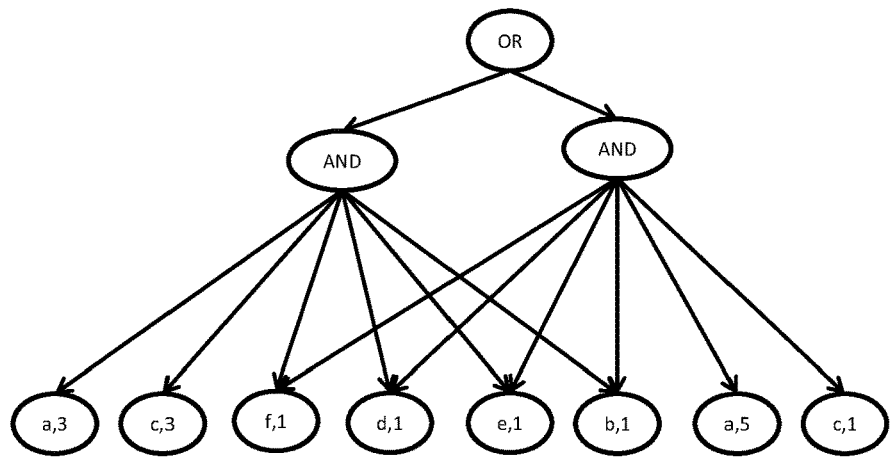
Fig. 13B
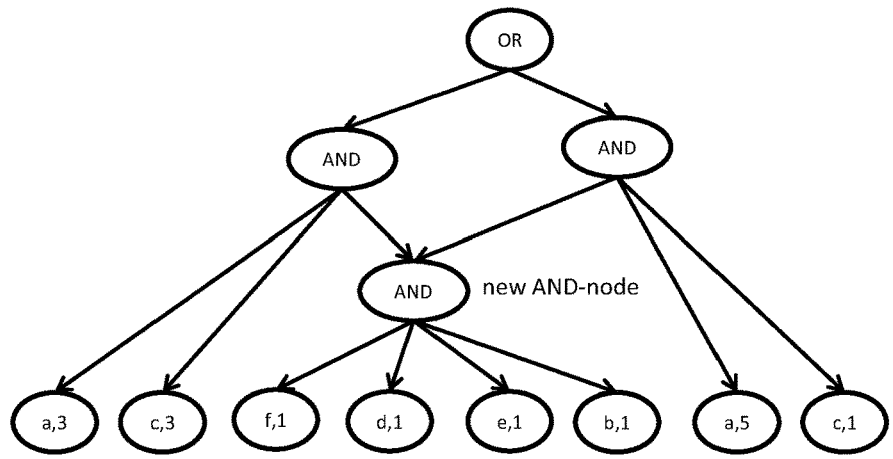
Fig. 13C

PRODUCT CONFIGURATION

FIELD OF THE INVENTION

The present invention relates to computer-implemented product configuration.

BACKGROUND

The focus in manufacturing industry has shifted from mass production to mass customization. Companies continually have to offer more product variants with greater flexibility. Customizable products (e.g. cars) generally exhibit various variables (e.g. Country a car is to be sold in, Steering Wheel indicates whether the steering wheel is to be mounted on the left-hand or the right-hand side, Fuel Type of a car, etc.), for each of which a user has to select a particular value out of a set of values (e.g. Diesel, Petrol for the variable Fuel Type) in order to configure the product. Usually, there are inter-dependencies among the variables and values of the product to configure. These inter-dependencies are captured by rules (e.g. if Country is Denmark (DK), then Steering Wheel is left, if Country is UK, Steering Wheel has to be set to right).

Product configuration is the computer-implemented process of finding a valid configuration for a configurable product, i.e. finding a combination among the values and variables of the product for which all rules between these variables and values are fulfilled.

Various approaches to implement product configuration methods by using computer technology have been taken in the prior art, such as:

U.S. Pat. No. 7,584,079 B2, which discloses a method of configuring a product composed of several inter-dependent parts. It employs "Virtual Tabulation", which is a method for keeping track of inter-dependencies among a large number of parts.

*Integrating CSP Decomposition Techniques and BDDs for Compiling Configuration Problems*; S. Subbarayan; CP-AI-OR Conference, Prague, 2005, Springer LNCS 3524, p. 351-368 [ToBBDs2005], which discloses a decomposition scheme for compiling configuration problems based on Trees-of-Binary Decision Diagrams.

*Knowledge Compilation Properties of Tree-of BDDs*; S. Subbarayan, L. Bordeaux, Y. Hamadi; AAAI Conference, Vancouver, 2007, p. 502-507[ToBDDs2007], which discloses a conjunction normal form to Tree-of-Binary Decision Diagrams compiler.

*Decomposable Negation Normal Form*; Adnan Darwiche, Journal of the ACM, Vol. 48, No. 4, July 2001, pp. 608-647 [DNNF2001], which discloses a target compilation language known as decomposable negation normal form (DNNF).

SUMMARY OF THE INVENTION

According to the present invention a method of configuring a product based on a product model is provided. The product model comprises variables, wherein each variable is associated with a set of values, and rules representing inter-dependencies among the variables and values. The variables and rules define a product configuration problem to be solved. The method comprises
generating, by a computer, a Decomposable And Or Graph, DAOG, representing the product model,
iteratively setting, by the computer, values for the variables of the product model based on the DAOG.

According to another aspect a computer system for configuring a product based on a product model as described above is provided.

According to yet another aspect a non-transitory computer readable storage medium having computer program instructions stored therein, which, when executed on a computer system, perform the method as described above, is provided.

Further aspects are set forth in the dependent claims.

BRIEF DESCRIPTION OF THE FIGURES

The present invention will be described with reference to the accompanying figures. Similar reference numbers generally indicate identical or functionally similar elements.

FIGS. 1A, 1B, and 1C illustrate a simple exemplary product model and the solution space of the respective configuration problem;

FIGS. 5A, 5B, and 5C show a binary encoding of the variable-value pairs of the simple exemplary product model of FIGS. 1A-1C;

FIGS. 8A to 11 illustrate the execution of an exemplary implementation for the exemplary product model of FIGS. 1A-1C;

FIGS. 12A, 12B, 12C, 13A, 13B and 13C present ways to refine a DAOG;

DETAILED DESCRIPTION

Figure 2:
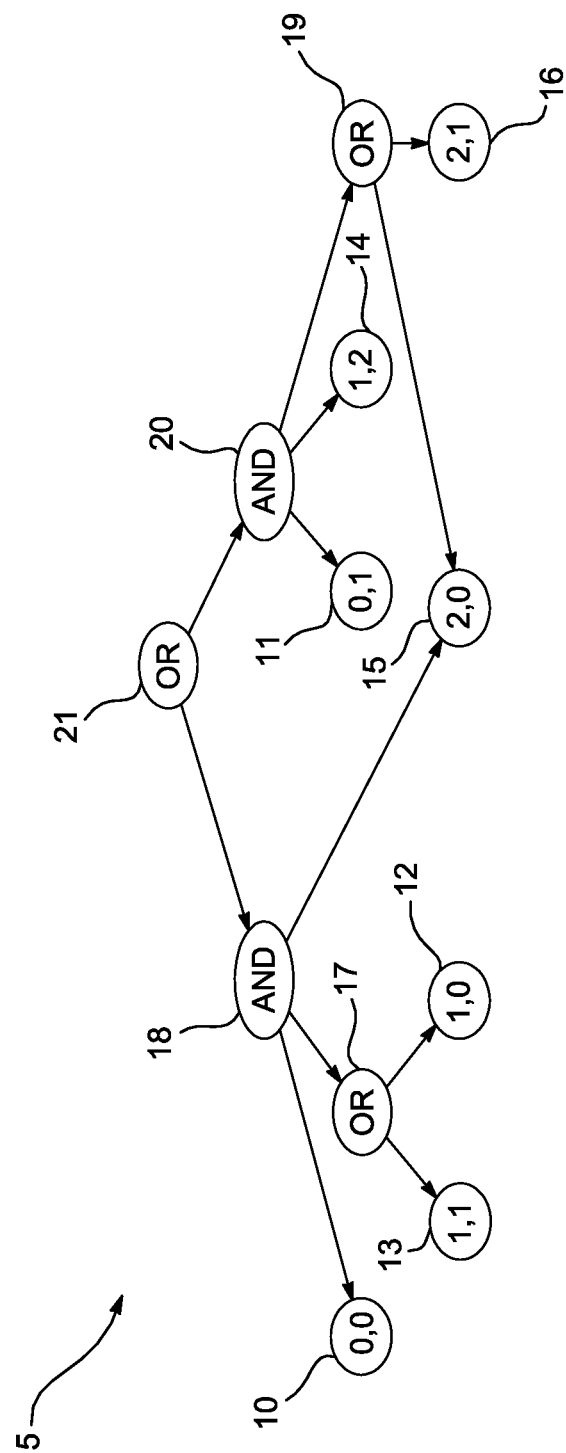
FIG. 2 shows a schematic representation of a simple exemplary DAOG.

Before turning to the detailed description with reference to FIGS. 4 to 23, some general aspects will be set forth first with reference to FIGS. 1A-1C, 2, and 3.

In the course of the description reference to set theory is made several times. The symbols of set theory thereby used are explained in the relevant literature, e.g. on Wikipedia (e.g. http://en.wikipedia.org/wiki/Set_(mathematics)).

The present invention generally relates to configuring a product based on a product model. In this context, the term "product" is to be understood broadly to cover any article or goods as well as processes (e.g. manufacturing processes, business processes) which occur in more than one setup or configuration. Thus, product models may not only be used to represent configuration problems of tangible goods, but more generally to represent any kind of configuration problem.

On the one hand, configurable products are characterized by various variables (by the skilled person also referred to as parameters, feature families, or option groups), representing the various dimensions of the product to be configured. Each variable has an associated set of values (by the skilled person also referred to as domains, types, features, or options). For each of the variables, a particular value has to be selected and set out of the respective set of values in order to obtain a complete product configuration. A variable with one of its associated values set is also referred to as variable-value pair hereinafter. On the other hand, there are inter-dependencies among various variables and values. These inter-dependencies are expressed by rules (by the skilled persons also referred to as constraints, or dependencies). Only if a selection of values for all variables of a product model fulfils all rules, this configuration is considered to be valid. To enable computer-implemented configuration, a product model including its variables and rules is established in a data structure processable by a computer.

A computer-based configuration of a product on the basis of a product model is generally performed by iteratively selecting and setting values for the various variables and, e.g. after the value of one or several variables has been set, the computer checking the current configuration for consistency by applying the rules.

The product model represents an entirety of variables with associated sets of values and rules and defines a product configuration problem. The product model can further contain sub-structures, in which, e.g., various variables or rules are grouped together. Additionally, several more features, like e.g. default values for some of the variables or mathematical functions depending on some variables, might be provided in the product model.

An example of a consumer product that might be subject to product configuration is a t-shirt. FIGS. 1A-1C show a simple exemplary product model of a t-shirt to be configured. FIG. 1A shows the three variables (associated set of values) of the t-shirt product model, which are the color (black, white, red, blue), the size (small, medium, large), and a particular print ("Men in black"-MIB, "Save the Whales"-STW) on the front of the t-shirt. In theory, there are 24 combinations among the values of the variables forming theoretically possible complete t-shirt configurations. However, the product model also stipulates two rules that need to be fulfilled for a valid t-shirt configuration:

1) If the MIB print is chosen, then the color black has to be chosen as well.
2) If the small size is chosen, then the print STW cannot be chosen (as this print does not fit on the small shirt).

Each of the rules associates two variables of the product model. Rule 1 defines the relation between the variables print and color, while Rule 2 relates to the variables size and print. FIG. 1B shows tabular representations of the respective rules, in which the allowed combinations of values for the variables of the respective rules are displayed.

With the restrictions introduced by the rules only eleven valid configurations out of the 24 possible complete t-shirt configurations remain. The eleven valid configurations are displayed in FIG. 1C. They form the solution space of the t-shirt product configuration problem, which includes all combinations among the values of the variables that fulfil all rules.

The process of product configuration, i.e. the task of finding a combination of values for all variables included in the product model for which all rules of the product model are fulfilled, is important in many areas, e.g. automotive, aerospace, high-tech, industrial machinery, industrial components, consumer products, medical equipment, mill products, chemicals, building and construction, software, energy, insurance, utilities, telecommunication, life sciences, or media, and in various fields of operations, e.g. during the development and manufacturing of a product, for price calculations of a product, for canvassing, or customer relationship management. In general, whenever there is a complex product or process that needs to be handled in an efficient way there might be a need for a computer implemented product configuration.

The computer-based configuration of a complex product is a complicated, computing-power-intensive and memory-demanding task. The configuration of a car, for example in the course of the development or manufacture/assembly of a car, may be regarded as a rather complex configuration problem. A typical car consists of several thousand parts, which are the potential variables of the car product model. For many of these parts various different choices exist, which form the sets of values associated with the variables. Out of these choices car developers, manufacturers, or potential customers pick one for each part in order to develop/assembly the car. However, not all choices are compatible. For example, if choices from different suppliers are used, they might not fit together. Additionally, there might be restraints regarding the costs of the car. For example, there might be an upper price limit on the engine of a car (in this case it could be useful to group all engine parts of the car together in a sub-structure of the product model). The entirety of restrictions among the parts and choices of the car is captured by the rules of the car product model. The variables, associated values, and rules of the car product model define the solution space of a car development or car assembly configuration problem. Typically, the solution space of such a configuration problem may represent more than $1 \times 10^{20}$ valid combinations.

In manufacturing industries product configuration is used in various respects. For example, it is used during the actual manufacturing of a car in order to ensure that the car is assembled according to a valid configuration and to supply an assembly line with the correct parts. As an assembly line utilized for car manufacturing is usually arranged to execute the manufacturing process within pre-determined time intervals, also the car configuration employed within the assembly process is subject to time constraints. Thus, a product configuration utilized within an automated or semi-automated manufacturing process is required to meet given response or calculation times.

Moreover, product configuration is also used for offering products to potential customers. Well-known examples are the websites of car manufacturers which enable potential customers to configure a car according to their desires. Such online configuration methods frequently store a representation of the respective product model on an online accessible configuration server. Size-restrictions for data stored on such servers often exist. Additionally, such servers need to respond within reasonable time intervals because long waiting times are not acceptable for a potential customer.

There are several methods known in prior art for computer-implemented product configuration. Some of these methods do not ensure that all valid solutions of a configuration problem are maintained during a configuration process, i.e. some valid solutions may be lost in the course of configuration. Other methods of the prior art return too many (allegedly) valid solutions of a configuration problem. Binary Decision Diagram (BDD)-based configuration methods, e.g. the already mentioned U.S. Pat. No. 7,584,079 B2, provide exactly all valid solutions of a configuration problem. However, an upper limit of the complexity of configuration problems exists for purely BDD-based methods, due to the complexity of the BDD structure. Another data structure of the prior art used for product configuration is the Tree-of-BDD (ToBDD) structure (see [ToBBDs2005], [ToBBDs2007]). ToBDD-based product configuration methods require a full-fledged BDD-package during the iterative product configuration, because the relations between all variables affected by the selection of a particular variable-value pair is generally spread over a plurality of BDDs (each BDD only defines the relation between some variables) and, as a consequence, complex logical BDD operations have to be executed in order to answer queries based on a ToBDD. Such BDD-packages may require up to 1000 MB of memory, or even more.

It is an objective of the present invention to address the problems of the prior art. The method of product configuration presented herein aims at handling complex configuration problems in a more efficient manner in terms of computing resources and response times than the approaches known in the prior art.

The general idea of the present invention is to employ a Decomposable And Or Graph (DAOG) as the central representation of a product model forming the basis for a subsequent iterative setting of values for variables. The DAOG representation is a modification of the Decomposable Negation Normal Form (DNNF) representation (see [DNNF2001]). While the DNNF representation includes terminal nodes (also referred to as leaf nodes) assigned with Boolean variables, the DAOG representation defines logical combinations for the variables of the product model by allocating variable-value pairs to its terminal nodes.

The inventors have realized the advantages of the DAOG-representation for a computer-implemented product configuration. As explained subsequently, a DAOG representation of a product model may be substantially smaller in size than a BDD representation of the same product model. This size-advantage allows it to represent/configure some product models in a DAOG-structure that cannot be represented/configured in a BDD structure within reasonable memory requirements. Furthermore, the size advantage of DAOG representations over BDD representations can also provide significant advantages during the iterative setting of values for the variables of a product model. For example, due its structure and its smaller size, querying a DAOG structure may be significantly faster (in terms of computing steps and/or response time) than querying a corresponding BDD structure.

For appropriate product models the DAOG representation is also smaller in size than the ToBDD representation. This size advantage comes along with the identical advantages described above with respect to the BDD structure. Furthermore, a DAOG based product configuration method requires, unlike a ToBDD based configuration method, no full-fledged BDD package for the iterative setting of variable-value pairs because the DAOG structure does not require complex logical BDD operations. This additionally saves online storage space and generally results in additional speed advantages.

A DAOG comprises a root node, internal nodes and terminal nodes, where:
  the root-node represents either a logical conjunction operation, AND-node, or a logical disjunction operation, OR-node,
  each internal node represents either an AND-node or an OR-node,
  each terminal node represents a variable-value pair, i.e. a variable of the product model with one specific value assigned to it, and
  each of the variables is defined by at most one sub-branch of an AND-node. In this way, it is ensured that only one value is assigned to a variable for each solution of the configuration problem.

The last point can precisely be described in the language of set theory: For an AND-node n in a DAOG, let vars(n) denote the variables occurring in a terminal node of the sub-DAOG rooted at n. Then, for any two child nodes c1 and c2 of n, vars(c1)∩vars(c2)=∅, i.e. the sets of variables associated with the branches represented by the child nodes of any AND-node are disjunct (cf. FIG. 12B depicting an exemplary DAOG of which the root AND-node has three child nodes establishing three sub-branches, the left-hand sub-branch defines the variables d, e, f, the middle sub-branch defines the variables a and c and the right-hand sub-branch defines the variable b).

The various nodes of a DAOG are connected by directed edges, thereby forming at least one path from the root node to a terminal node. However, this does not mean that all the nodes of a DAOG are directly connected with each other. In contrast, two terminal nodes of a DAOG are never directly connected with each other. In a DAOG, each structure rooted at an internal node defines a DAOG by itself, i.e. each internal node can be considered as root-node of a new DAOG.

The root-node of a DAOG is the origin of at least two edges, each of which does either point to internal nodes of the DAOG or directly to terminal nodes of the DAOG. As the root-node is the starting point of a DAOG, no edge points to the root-node itself.

Each internal node of a DAOG has at least one edge pointing to it. The at least one 'pointing edge' has its origin in another node of the DAOG, which might be another internal node located closer to the root-node of the DAOG or might even be the root-node itself. Each internal node of a DAOG is the origin of at least two 'pointing edges' itself, each of which does either point to another internal node located closer to a terminal node of the DAOG or directly to a terminal node of the DAOG.

At least one edge of a DAOG points to each terminal node of a DAOG. The at least one 'pointing edge' has its origin in another node of the DAOG, which might be an internal node or might even be the root-node itself.

The internal nodes of a DAOG might have an isomorphic substructure, i.e. internal nodes may share some of all of their child node. The shared nodes might be internal nodes as well or terminal nodes.

An exemplary DAOG illustrating the general structure of a DAOG is depicted in FIG. 2.

Each AND/OR node of the exemplary DAOG 5 of FIG. 2 is identified by a label "AND"/"OR", respectively. Each terminal node is labeled "X, A", denoting the assignment of a value "A" to the variable "X".

The exemplary DAOG 5 represents three variables {0, 1, 2} with associated values {0, 1, 2}, {0, 1, 2} and {0, 1}, respectively. One can note that the DAOG 5 does not have a terminal node corresponding to the assignment of the value "2" for the variable "0". This means that this variable-value pair is not included in the solution space of the DAOG 5, i.e. that it is not allowed by the rules of the DAOG 5 (which are not provided in detail). Such a variable-value pair, which is generally not included in the solution space of a DAOG 5, is also referred to as a 'blocked' variable-value pair hereinafter.

Starting from the root-node 21, which is an 'OR'-node in the example of FIG. 2, two edges point towards the 'AND'-nodes 18 and 20, respectively. Starting from the 'AND'- node 18 three edges point towards the nodes 10, 17 and 15, respectively. While the nodes 10 and 15 are both terminal nodes each defining a certain variable-value pair, the node 17 is an internal 'OR' node. Starting from this 'OR'-node two edges point at the terminal nodes 13 and 12. Starting from the 'AND'-node 20 three edges point at the nodes 11, 14, and 19. While the nodes 11 and 14 are both terminal nodes each defining a certain variable-value pair, the node 19 is an internal 'OR' node. Starting from this 'OR'-node two edges point at the terminal nodes 15 and 16. In total, eight (partly) different paths from the root node 21 to a terminal node exist.

Each node of the DAOG 5 in FIG. 2 represents a solution space over the variables occurring beneath it. For example, the terminal node 13 represents a solution space over the variable "1" having the value "1" as the only solution. The AND node 20, in contrast, represents two solutions over three variables, as indicated in Table 1.

TABLE 1

The solution space defined by the AND node 20 of the DAOG of FIG. 2.

| Solution | Variable "0" | Variable "1" | Variable "2" |
| --- | --- | --- | --- |
| #1 | 1 | 2 | 0 |
| #2 | 1 | 2 | 1 |

Since the node 21 is the root node of the DAOG 5 shown in FIG. 2, it represents its complete solution space. It includes four different combinations of values for the three variables {0, 1, 2}, as indicated in Table 2:

TABLE 2

The solution space defined by the DAOG of FIG. 2.

| Solution | Variable "0" | Variable "1" | Variable "2" |
| --- | --- | --- | --- |
| #1 | 0 | 1 | 0 |
| #2 | 0 | 0 | 0 |
| #3 | 1 | 2 | 0 |
| #4 | 1 | 2 | 1 |

Figure 3:
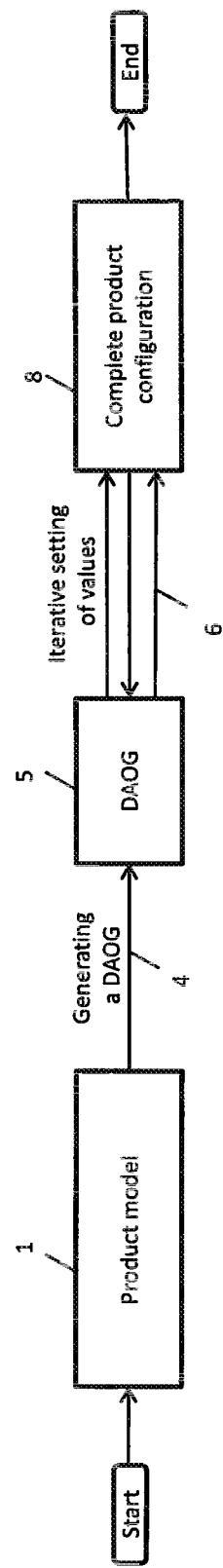
FIG. 3 shows a flowchart representing the general configuration method described herein.

FIG. 3 displays a flowchart following the principles of the present invention. The product configuration method starts with a product model 1. The product model 1 includes at least the variables with associated sets of values and the rules, representing the inter-dependencies among the variables and values, of the configuration problem. The product model is specified in a computer-readable format in order to be usable as input for the computer-based configuration. Next, based on the product model 1, a DAOG 5 is generated by activity 4. As already introduced above, the DAOG 5 is a graph-based representation of the product model 1. The DAOG 5 is used as the starting point for the iterative setting of values (activity 6) for each of the variables of the product model. During the iterative setting 6 of values, queries are processed by utilizing the DAOG 5 in order to iteratively proceed with the configuration. These queries are answered, e.g., be traversing the DAOG 5 under consideration of the specific query. Finally, values for all variables of the product model 1 are set. At this stage, a complete product configuration 8 is specified and the product configuration terminates.

In some embodiments, the generation of a DAOG (i.e. 1, 4, and 5 of FIG. 3) is performed offline, e.g. by one or more servers not accessible by end-user configuration requests. User input is not necessary during the generation of a DAOG. The DAOG is generally only generated once per product model. However, it might be updated in the case of a product model adaption. A DAOG generation employing offline servers might provide computation capacities not available (in terms of costs, absolute computation power, response time, etc.) on online accessible servers.

In some embodiments the iterative setting of values (i.e. 6 and 8 of FIG. 3) is performed on an online accessible configuration server. If this online accessible configuration server differs from the server(s) used for generating the DAOG, the generated DAOG is transferred from the offline to the online server(s). The iterative setting of values is generally performed multiple times on the basis of the same DAOG.

In some embodiments, a product configuration is only successfully finished, if all rules included in the product model 1 are fulfilled by the complete product configuration 8. Other embodiments also allow to complete the configuration with a non-valid configuration (the fact that the found configuration is not valid may be presented to the user) and/or to abort the method of product configuration before a complete product configuration 8 is obtained.

In some embodiments, e.g. if the product model's original representation is not computer-readable (e.g. it is written on a sheet of paper), the product configuration includes establishing or converting the product model 1 into a Boolean-encoded product model (which is one example of a computer-readable and computer-processable representation of the variables and associated values of the product model). All variables with associated values and rules are encoded as one or more Bits, i.e. the values associated to the variable are the Boolean values true and false (or 1 and 0). During the conversion of the original product model representation into a Boolean-encoded product model, the rules of the product model 1 are converted as well, into a representation suitable for associating with the Boolean-encoded variables. The conversion of a product model into a Boolean product model is described in more detail, for example, in the above mentioned reference U.S. Pat. No. 7,584,079 B2.

In some embodiments, Rule Binary Decision Diagrams (R-BDDs) are generated, which represent the rules of the product model. A Rule Binary Decision Diagram (R-BDD) may be built for each rule included in the product model. Also, several rules may be combined to a single R-BDD. A Binary Decision Diagram (BDD) is a rooted directed acyclic data structure used to represent Boolean functions; the two terminal nodes of a BDD are usually marked as 0 and 1, respectively. An R-BDD is a logical description of a rule included in the product model based on the dependent variables of the respective rule. The entirety of generated R-BDDs represents the rules of the product model. The generation of R-BDDs based on a product model is described, for example, in the above mentioned U.S. Pat. No. 7,584,079 B2. As a Boolean representation of variables and associated values, also the R-BDDs are established in a computer-readable and computer-processable form in order to be processed by the computer implementing the configuration method.

The representation of rules as R-BDDs takes advantage of the fact that the information contained in typical rules of a product model can often be represented in a BDD-like structure in a very natural way. Consequently, the representation of rules in the R-BDD format may facilitate a good scalability of the product model, in particular of the rules of the product model. The generated R-BDDs may be used as the basis for the generation of a DAOG data structure. For generating a DAOG structure based on an R-BDD representation of the rules a BDD-based DAOG-compiler may be employed.

In some embodiments, a BDD-based DAOG compiler is utilized to generate a DAOG on the basis of a Boolean-encoded representation of the product model. In some embodiments, generating the DAOG comprises employing a recursive routine. In each loop of the recursive routine a least one additional node is added to the DAOG. During such a recursive routine the compiler may analyse/traverse the R-BDDs several times and simplify or decompose them.

In some embodiments, the recursive routine of the compiler includes cache-operations, e.g. to store the intermediate results of an analysis/traversal of an R-BDD. Generally, re-computations of subsequent identical/similar requests during the generation of the DAOG may be avoided by use of cache-operations.

During the generation of a DAOG structure, a DAOG-compiler may first create the root-node of the DAOG. Subsequently, internal nodes ('AND'/'OR') and terminal nodes may be added below this root node. All the variables of the product configuration problem to be represented in the DAOG structure appear in at least one terminal node below the root node. Variable-value pairs which do not appear in at least one terminal node below the root-node are 'blocked' combinations, i.e. they are not part of the solution space of said configuration problem.

In some embodiments, the following routine is used by a DAOG-compiler to generate a DAOG 5:
- an 'AND'-node is added to the DAOG, if at least two nodes below said 'AND'-node need to be combined in order to obtain a solution of the configuration problem. Consequently, at least two different variables need to appear below any 'AND'-node.
- an 'OR' node is added to the DAOG, if a decision between two nodes appearing below said 'OR' node is required in order to obtain a solution of the configuration problem. Consequently, only one variable needs to appear below any 'OR'-node. In a case where only one variable appears below an 'OR'-node, said 'OR'-node is used to assign different values to the one variable.
- an terminal node is added, if the assignment of a specific value is required in order to obtain a solution of the configuration problem. Consequently, each terminal node represents a variable-value pair representing the assignment of a particular value to a specific variable.

Edges are used to connect two nodes of a DAOG 5; a path between the two connected nodes is created. Such a path indicates that the nodes can be combined in order to obtain a solution of the configuration problem.

As mentioned above, configuration problems may be very complex and include a large number of variables and rules. A plurality of these rules may be interlinked with each other, forming a complicated network of inter-dependencies. In such a case it is useful to apply conversion-methods to the rules of the product model prior to the actual generation of a DAOG-structure. Conversion-methods may arrange the rules in a more favourable way in terms of computer processing. This may result in a smaller (in terms of memory space) DAOG-structure representing the product model and/or in a faster processing of the product configuration problem using said DAOG structure.

In some embodiments, generating a DAOG comprises the BDD-based DAOG compiler converting R-BDDs. Such a conversion comprises at least one of the following activities:
- propagating unary constraints through R-BDDs,
- splitting of R-BDDs,
- merging of R-BDDs,
- synchronizing of R-BDDs, and/or
- partitioning R-BDDs.

The above mentioned conversion activities, their purposes and functions are described in more detail further below with reference to FIGS. 8A-8C.

In some embodiments, a generated DAOG is subject to post-processing. The post-processing comprises employing Boolean-logic based transformations on the DAOGs in order to reduce the size of the generated DAOG. Thereby, the time required for the compilation of the DAOG may be reduced as well. Additionally, queries regarding a product configuration may be answered faster based on the transformed and thereby optimized DAOG.

In some embodiments, the Boolean-logic based transformations are already employed during the generation of the DAOG. If the generation of the DAOG employs a recursive routine, Boolean-logic based transformations can be employed during each loop of the recursive routine. The Boolean-logic based transformations may reduce both the node-count and/or the edge-count of the DAOG. After such a transformation, the DAOG still represents exactly the same product model as prior to the transformation.

Based on a DAOG 5 values for the variables of the product models are set. This setting of values for variables (activity 6 in FIG. 3) is an iterative process. The values for the variables are selected (either by a user or automatically) one after another and respectively set by the computer performing the configuration process. The iteration ends at the latest once values for all variables of the product model are set, i.e. if a complete product configuration 8 is obtained.

In some embodiments, the iterative setting of values for variables of the product model includes setting a value for at least one variable, said setting resulting in a so called 'partial' configuration. A partial configuration is a subset of variables of the product model, each of the variables having a particular value assigned. A partial configuration includes at least one variable of the product model and at most all variables of a product model. If a partial configuration includes all variables of a product model, it is called a complete configuration 8.

In some embodiments, a depth-first search is performed along the DAOG 5 representing the product model in order to verify whether a partial configuration is consistent with the rules of the product model, i.e. weather it is a 'valid' partial configuration. A partial configuration is valid if its variable-value pairs comply with the rules of the product model. A partial configuration is, however, invalid if at least one of its variable-value pairs does not comply with the rules of the product model.

Generally, the speed in which a graph representation of a product model is queried (i.e. the response time) in order to process one iteration (e.g. by use of a depth-first search) proportionally depends on the size of the graph representation, particularly on the number of edges and nodes of the specific graph structure. As DAOG representations of certain product models are significantly smaller in size than other graph representations (e.g. ToBDD, BDD) of the same product model, using a DAOG-based configuration method decreases the response time of queries compared to configuration methods based on other graph representations (assuming similar hard- and firmware).

If a partial configuration is found to be valid, there might be an interest to extend the valid partial configuration, i.e. to add more variable-value pairs to the partial configuration whereas the partial configuration remains valid. Such variable-value pairs which can be used to extend a valid configuration are called 'admissible' variable-value pairs. Admissible variable-value pairs are not yet part of the valid partial configuration considered at a certain stage of the iterative process 6, but they are consistent with the rules of the product model considering the current valid partial configuration. In the language of set theory, admissible variable-value pairs can be defined as follows: Let ρ be a valid partial configuration. Then, each variable-value pair (x, a) ∉ρ for which ρ∪{(x, a)} also represents a valid partial configuration is an admissible variable-value pair.

In some embodiments, after it is found that the current partial configuration is valid, the iterative setting of values for variables comprises determining further admissible variable-value pairs. After further admissible variable-value pairs were determined, they might be used to extend the current valid partial configuration to a subsequent valid partial configuration and further on to a valid complete configuration.

In some embodiments, two subsequent depth-first searches are performed on the DAOG representing the product model in order to determine all admissible variable-value pairs. In the course of the first depth-first search all nodes of the DAOG 5 are visited. Each visited node is e.g. flagged (two e.g. different states) considering both the rules of the product model and the partial configuration (i.e. the already selected variable-value pairs). The flags are used in order to identify if a particular node can still be visited in the course of the second depth-first traversal through the DAOG 5. The terminal nodes reachable in the second depth-first traversal represent admissible variable-value pairs, while the terminal nodes not reachable in the second depth-first traversal represent so called 'inadmissible' variable-value pairs, which cannot be used to extend the valid partial configuration.

Some variable-value pairs of a valid partial configuration might be independent from any other variable-value pair of the valid partial configuration, i.e. they are not affected by the rules of the product model considering the other variable-value pairs of the valid partial configuration. Such variable-value pairs, for which the value can be replaced by at least one alternative value associated to the variable of the variable-value pair whereas the remainder of the valid partial configuration remains valid upon replacement, are called 'free' variable-value pairs. In the language of set theory, free variable-value pairs can be defined as follows: Let ρ be a valid partial configuration. Then, each variable-value pair (x, a)∈ρ is a free variable-value pair, if at least one alternative value b exists in the domain of x, for which ρ\{(x, a)}∪{(x, b)} also represents a valid partial configuration.

In some embodiments, the iterative setting of values for variables includes determining free variable-value pairs. After the free variable-value pairs were determined, the value of each of the free variable-value pairs may be reset and instead an alternative value may be set. The result of this procedure is another valid partial configuration.

In some embodiments, the iterative setting of values for variables includes both determining admissible as well as free variable-value pairs. In some embodiments, two subsequent depth-first searches are performed on the DAOG 5 representing the product model in order to determine the entirety of admissible and free variable-value pairs. In the course of the first depth-first search all nodes of the DAOG 5 are visited. Each visited node is e.g. flagged (here e.g. as being in one of three different states) considering both the rules of the product model and the partial configuration (i.e. the already selected variable-value pairs). The flags are used in order to identify if a particular node can still be visited in the course of the second depth-first traversal through the DAOG 5. The terminal nodes reachable in the second depth-first traversal represent admissible/free variable-value pairs, while the terminal nodes not reachable in the second depth-first traversal represent inadmissible/non-free variable-value pairs.

Based on a DAOG structure, determining both admissible as well as free variable-value pairs simultaneously is not very costly (in terms of computation resources, response time, etc.). Only two depth-first searches are required (see above) to obtain the desired result, independent of the amount of variables being part of a partial configuration. However, the same request may be significantly more costly based on other graph representations of a product model. For example, determining both admissible as well as free variable-value pairs based on a ToBDD-representation of the product model is significantly more complex, due to the different structure of ToBDDs. If, exemplarily, a partial configuration includes ten variable-value pairs, at least 33 depth first traversals need to be performed on a ToBDD structure to obtain the desired result.

If a partial configuration is found to be valid, there might be some variable-value pairs which are not part of the valid partial configuration and which also cannot be used to extend the valid partial configuration. As already mentioned above, such variable-value pairs being in conflict with at least one variable-value pair of the valid partial configuration are called 'inadmissible' variable-value pairs. They are not consistent with the rules of the product model considering the valid partial configuration. In the language of set theory, inadmissible variable-value pairs can be defined as follows: Let ρ be a valid partial configuration. Then, each variable-value pair (x, a) ∉ρ, for which ρ∪{(x, a)} does not represents a valid partial configuration, is an 'inadmissible' variable-value pair.

In some embodiments, the iterative setting 6 of values for variables includes determining inadmissible variable-value pairs. Such inadmissible variable-value pairs can only become admissible variable value pairs if the conflicting variable-value pairs of the valid partial configuration are removed from the valid partial configuration. In some embodiments, variable-value pairs of the valid partial configuration are determined, which need to be removed from the valid partial configuration in order to render inadmissible variable value pairs admissible.

Now turning to the more detailed description, the exemplary T-shirt configuration problem introduced above with reference to FIGS. 1A-1C is subsequently used to describe certain embodiments of the present configuration method.

Figure 4:
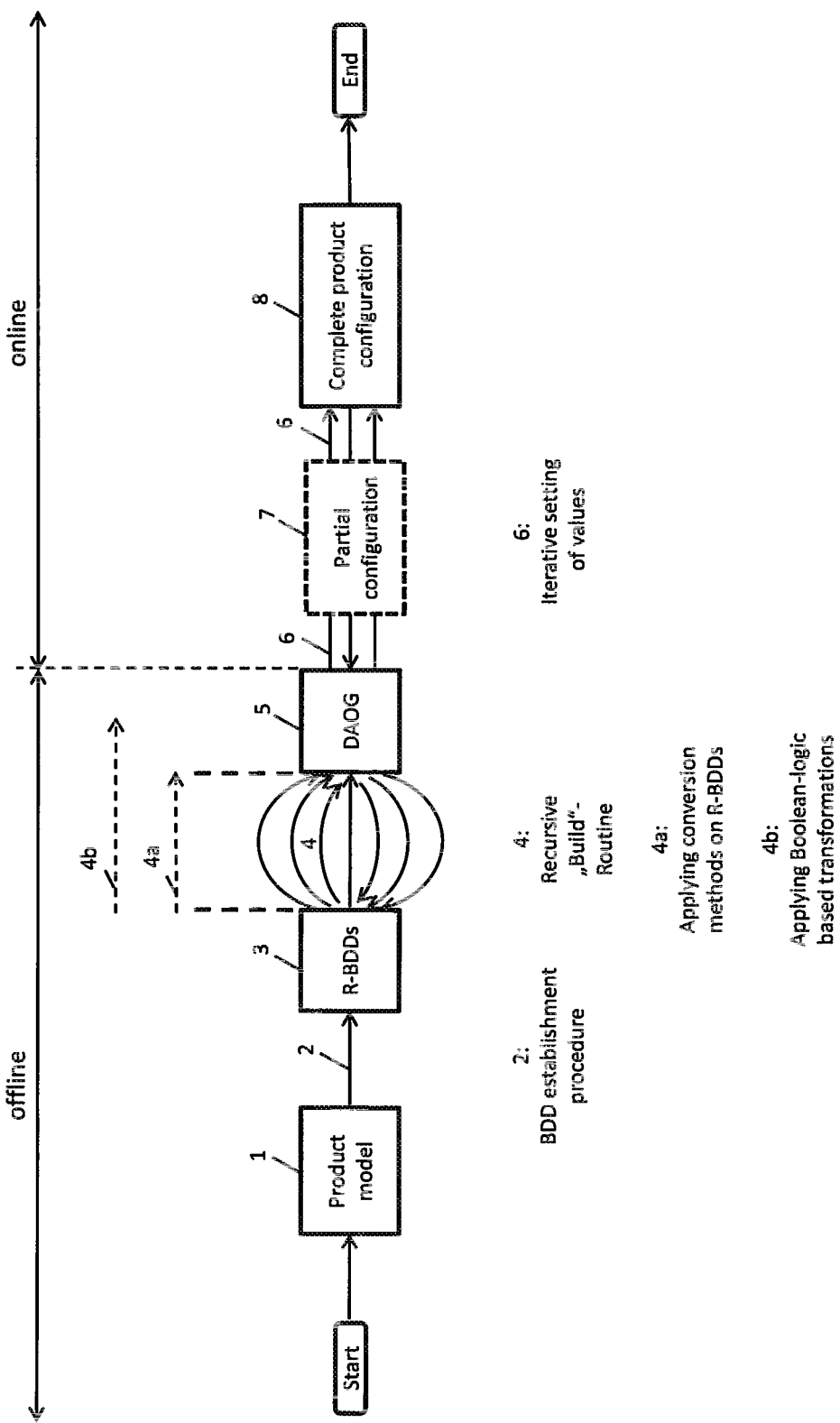
FIG. 4 shows a flowchart representing an embodiment of the configuration method described herein.

FIG. 4 displays a flowchart representing an embodiment of the present configuration method. The method takes a product model 1 as input. Based on the product model 1, an arbitrary BDD establishment routine 2 is used to transform the rules of the product model into a BDD-structured representation, the R-BDDs 3. The R-BDDs 3 are the starting point for a recursive routine 4, called "Build", which generates a DAOG structure 5 representing the solution space of the product model 1. During the Build-routine 4 conversion methods 4a are applied to the R-BDDs 3 in order to simplify their structure and reduce the computational complexity needed for their processing. Furthermore, Boolean-logic based transformations 4b are applied during the generation of the DAOG 5 and/or to the generated DAOG 5 in order to reduce the size of the intermediate DAOG version or the established full DAOG 5. The DAOG structure 5 itself is the basis for the subsequent iterative setting 6 of values for the variables of the product model 1. During the iterative setting 6 of values, the variables with already set values form a so called partial configuration 7. Eventually, the setting of values for all variables of the product model 1 results in a complete product configuration 8. A complete product configuration is the output of the product configuration method of FIG. 4. The configuration method of FIG. 4 generates the DAOG 5 in an offline phase, as indicated. After the DAOG is generated, it is provided to an online accessible server used for the iterative setting of values 6.

FIGS. A, 5B, and 5C provide an overview of an exemplary binary encoding of the three variables color, size and print of the T-shirt product model during the BDD establishment routine 2. In total, the three variables of the T-shirt product model are encoded by 5 Bits (numbered 0 to 4). The number of Bits required to encode a particular variable of the product model depends on the amount of values which are associated to the variable. For example, four values (Black, white, red, blue) are associated to the variable color and need to be encoded. This requires four combinations and therefore two Bits (two Bits provide $2^2=4$ combinations). The two Bits used to encode the color are the Bits 0 and 1.

Figure 6:
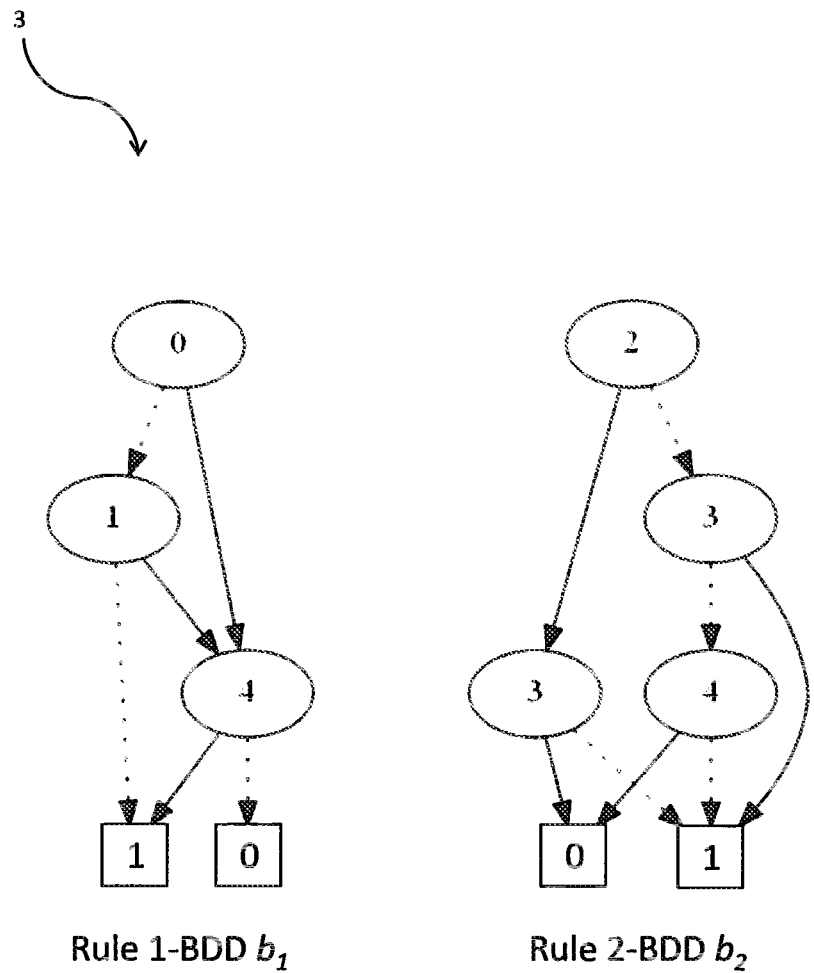
FIG. 6 shows the rules of the exemplary product model of FIGS. 1A-1C represented by two BDDs.

Based on the binary encoding shown in FIGS. 5A-5C, the rules of the T-shirt product model (FIG. 1B) are transformed in R-BDDs 3. FIG. 6 shows two R-BDDs representing the two rules of the T-shirt configuration problem. In the R-BDDs each Bit is represented by a node. Each node has two outgoing edges; a dashed one representing the low end (i.e. Bit value=false), and a solid one representing the high end (i.e. Bit value=true). For all combinations allowed by a rule, the path from the root node of the respective R-BDD (0-node representing Bit 0 for Rule 1, 2-node representing Bit 2 for Rule 2) to the bottom reaches the 1-terminal node, while the combinations forbidden by the rules or undefined encoding combinations terminate at the 0-terminal node. The R-BDD of Rule 1, for example, allows all combinations with Bit 0=false and Bit 1=false, as the path along the dashed edges (i.e. false), which starts at the 0-node (representing Bit 0) and runs via the 1-node (representing Bit 1), terminates at the 1-terminal node. As can be seen in FIG. 5A, this path, i.e. the combination Bit 0=false and Bit 1=false, represents the setting of color=black. The fact that the above described path does not include any other node (in particular, not the 4-node representing the variable print) illustrates that Rule 1 does not present any limitations with respect to the other variables of the product model, as long as the variable color is set to be black.

Figure 7:
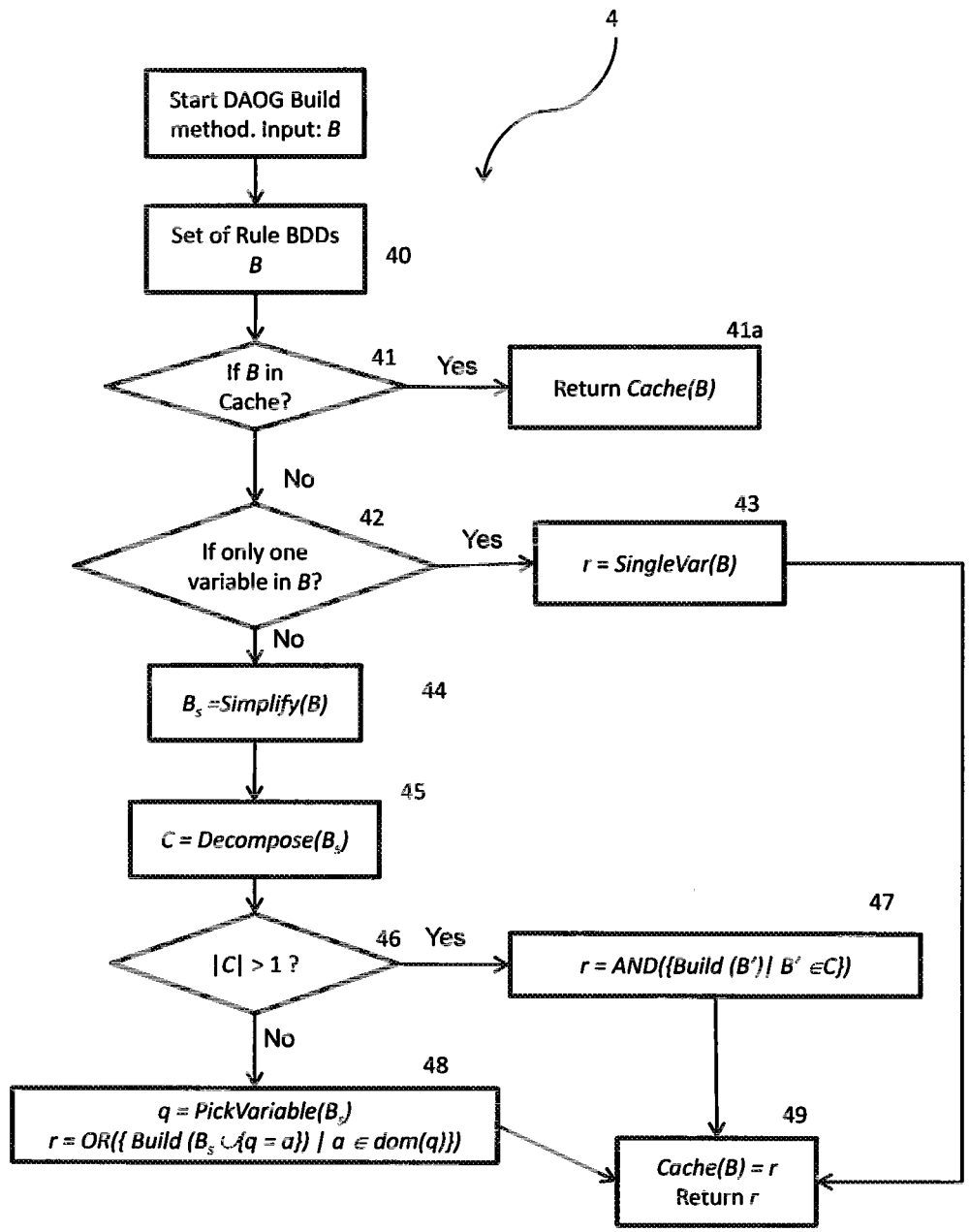
FIG. 7 depicts an implementation example for generating a DAOG from a BDD-based representation of a product model.

FIG. 7 shows a general flow-chart of the recursive Build-routine 4, which generates a DAOG based on a product model 1:

At 40, the set of Rule BDDs B of a product model is taken as an input.

At 41, it is checked if the answer, i.e. a particular DAOG structure, for the input B is already in cache. If so, the method returns the cached result at 41a. Otherwise, the method moves forward to 42.

At 42, it is checked if the set B has BDDs over only variable x. If so, 43 is next, otherwise 44.

At 43, the method SingleVar is executed to generate a DAOG node r representing the assignments for the variable x allowed by the BDDs in the set B. The input to the SingleVar method is one or more BDDs B over only one variable x. If B consists of more than one BDD, all BDDs of B are conjoined into one BDD representing the allowed values for x. If the resulting BDD allows only one value for x, i.e. if the corresponding path for the only value for x leads to the one terminal BDD-node, the output of SingleVar will be a terminal DAOG-node corresponding to the assignment of the only value to x. If the resulting BDD allows more than one value, the output of SingleVar will be an OR node, with one child terminal-node for each value allowed by the BDD.

At 44, the input BDDs B are converted using the call "Simplify", which may employ various simplification methods to the set of BDDs B (e.g. the simplification methods already mentioned above which will be further explained below). The simplified result is stored in another set of BDDs, $B_s$.

At 45, the set $B_s$ is partitioned into sets of BDDs C, such that each BDD b in $B_s$ occurs in exactly one element of C. The method "Decompose" used for partitioning the set $B_s$ is explained in more detail below.

At 46, it is checked if the set C has more than one element. If so, 47 is executed to build an AND-node. Otherwise, 48 is executed to build an OR-node.

At 47, for each element B' in the C partition set a recursive call to the "Build" method is made with the set of BDDs B' as input. Finally, a new AND-node is created having the resulting nodes of the descendant "Build (B')" calls as child-nodes.

If 48 is reached, there is only one element in C, which is $B_s$ itself. At 48, a variable q occurring in the set $B_s$ is selected as branching variable. The selection may be based on some heuristics. One possible approach is to select the variable occurring in the most BDDs in $B_s$ as branching variable. After selecting the branching variable q, for each value a associated to q a descendant "Build" call is made. The input set of BDDs of such a call is $B_s \cup \{q=a\}$, i.e. one more variable assignment is added to $B_s$. Finally, a new OR node is created having the resulting nodes of descendant "Build ($B_s \cup \{q=a\}$)" calls as child nodes.

At 49, the incoming result node r is stored in the cache as the result for processing input rule BDDs B. Subsequently, the node r is returned as output.

During the recursive Build routine 4 conversion methods 4a are (optionally) applied to the R-BDDs 3 (activities 44 and 45 in FIG. 7). These conversion methods may reduce the computational complexity of the R-BDDs 3 prior to the generation of the DAOG 5. The exemplary conversion methods 4a described below take a set of rules/constraints as input, and output a new set of rules/sets of constraints. Note that all these methods are described based on a BDD-representation of rules. In principle, however, these methods are independent of the specific representation of the rules.
Unary Constraint Propagation:

A Unary Constraint is a constraint defined over only one variable. 'Unary constraint propagation' conjoins (logical AND) a Unary Constraint with any other rule depending on this variable. After such an operation the unary-constraint becomes redundant and is removed. Note, if a variable has more than two values, it will be represented by more than one Boolean variable in a BDD.

In the language of set theory 'Unary Constraint Propagation' can be described as follows: If any BDD b is defined over only one finite domain variable var, then for each other BDD b' having the variable var, the BDD b' will be replaced by a BDD logically equivalent to a "conjoin" operation between b and b' (i.e., b':=b'∧b).
Split:

This method splits a rule included in a product model into a plurality of rules. The resulting plurality of rules replace the original rule in the product model.

A rule included in the product model may generally depend on a plurality of variables of the product model. By splitting the rule into a plurality of rules the number of inter-depending variables being affected by the rule may be reduced.

In the language of set theory the 'Split'-method can be described as follows: For a BDD b, let vars (b) be the variables occurring in the BDD. The "Split" method determines opportunities to split the BDD b of a set of BDDs $\vec{w}$ into two BDDs $b_1$ and $b_2$, such that $b=b_1 \wedge b_2$, vars $(b_1)$ $\subset$ vars (b) and vars $(b_2) \subset$ vars (b). Both vars $(b_1)$ and vars $(b_2)$ are non-empty proper subsets of vars (b) and, vars $(b_1) \neq$ vars $(b_2)$. For each such split opportunity available for a BDD in b in $\vec{w}$, the split method will remove b from $\vec{w}$ and add $\{b_1, b_2\}$ to $\vec{w}$.

Merge Common Sub-Support:

This method merges two original BDDs to a new BDD, if the depending variables of one of the original BDDs are a subset of the supporting variables of the other of the original BDDs. The method returns a single 'merged' BDD.

In the language of set theory the 'Merge Common Sub-Support' method can be described as follows: If there are two BDDs $b_1$ and $b_2$ in a set of BDDs $\vec{w}$, such that for their supporting variables vars$(b_1) \subseteq$ vars$(b_2)$, then both the BDDs $b_1$ and $b_2$ will be removed by this method from $\vec{w}$ and a new BDD b will be added to $\vec{w}$, where $b=b_1 \hat{} b_2$.

All Neighbours Sync:

This method synchronizes the solution of two BDDs having at least one common variable, such that a solution for one BDD can be "extended" to be a solution for the other BDD. The method returns two BDDs, which are synchronized with respect to each other.

In the language of set theory the 'All Neighbours Sync' method can be described as follows: For a BDD b, let Proj(b, K) represent a BDD obtained by existential quantification of all the variables from b, except the variables in K (also termed as projection of b on K). Let two BDDs $b_1$ and $b_2$ be in a set of BDDs $\vec{w}$, such that vars$(b_1) \cap$ vars$(b_2) \neq \emptyset$. Let $b_c$=Proj$(b_1,$ vars$(b_1) \cap$ vars$(b_2)) \wedge$ Proj$(b_2,$ vars$(b_1) \cap$ vars $(b_2)$). That is, the BDD $b_c$ represents the conjunction ($\wedge$) of the projections of the solutions of both the BDDs on their common variables (vars$(b_1) \cap$ vars$(b_2)$). This method will replace the two BDDs $b_1$ and $b_2$ with two new BDDs equivalent to $(b_1 \wedge b_c)$ and $(b_2 \wedge b_c)$.

Decompose:

This method partitions an original set of rules into several new sets of rules such that each rule of the original set of rules occurs in exactly one of the new sets of rules. The new sets of rules will be such that, for any variable x, all the rules having the variable x will appear in only one of the new sets. If two variables x and y occur together in a rule, then all the rules having any one or both of those two variables will also occur together in a same new set. Recursively, this defines that all the rules which are connected through variables occur together in same set. Any two rules not connected directly (by having a common variable) or indirectly (by a chain of connected variables) will not occur together in a same new set. The idea of the Decompose method is to divide the input rules set into independent components (if possible), so that each component having a smaller set of rules is easier to handle separately, ignoring other components influence. Since the components are independent (if more than one such component exists), they don't share any variable. Correspondingly, an AND-node can be created to represent the collection of such components (with one child of the AND node corresponding to each component). Note that the "decomposability" property of an AND-node requires that two child nodes do not share a common variable. Whenever the recursive DAOG building process finds an opportunity for such a decomposition of its input rules, it creates a corresponding AND-node taking advantage of decomposability.

Given a set of rules, a "dependency graph" is defined to be an undirected graph having one node for each variable in the input set of rules. There will be an edge between two nodes in the graph if and only if the corresponding two variables (of the nodes) occur together in an input rule. Given such an undirected dependency graph, the connected components (see: e.g. http://en.wikipedia.org/wiki/Connected_component_(graph_theory)) can be easily obtained. Each such connected component defines a new set in the output of the "Decompose" method. If a connected component has only one node, this means that either the corresponding variable does not have any rule in the input set or the variable occurs alone in one or more single-variable BDDs. If the variable does not occur in any rule, then a dummy "TrueBDD"-rule is used to specify that the variable is unconstrained. Otherwise, the set of rules having the variable will form one of the output sets of the Decompose method. If more than one node belongs to a connected component, then all the input-rules whose occurring variables are completely covered by the connected component's nodes will form a corresponding set of rules in the output set of sets of rules. If all the variables/nodes are connected, the output set of Decompose will have only one set (equivalent to the input set).

The following pseudo-code 'Decompose' explains the 'Decompose' method in more detail:

```
Decompose($\vec{x},\vec{v}$)
// The method takes a set of variables $\vec{x}$ and a set of BDDs $\vec{v}$ as input, whereby
// the BDDs in $\vec{v}$ define a solution space over the variables in $\vec{x}$
1.   D := DependencyGraph($\vec{x},\vec{v}$)
2.   C := ∅
3.   for each connected-component 'cc' in D
4.      $\vec{y}$ := "the set of variables having a node in 'cc' "
5.      $\vec{c}$ := { $v_i$ | vars($v_i$) ⊆ $\vec{y}$ , $v_i \in \vec{v}$ }
6.      if $\vec{c}$ = ∅
7.         $\vec{c}$ := { TrueBdd }
8.      C := C ∪ ($\vec{y},\vec{c}$)
9.   return C
```

At line 1, the method first builds a dependency graph "D". The dependency graph has a node for each variable var$\in \vec{x}$. In the graph D, an edge will be generated between two nodes $var_1$ and $var_2$, if the corresponding two variables occur together in a BDD b$\in \vec{v}$, i.e. $var_1 \in$ vars(b) and $var_2 \in$ vars(b). All nodes which are connected by edges-form a connected component "cc".

At line 2, the set of output components "C" is initiated as empty.

At line 3, a for-loop iterates for each connected-component "cc" of the graph D. For each "cc", a set of variables $\vec{y}$ is defined, wherein each variable of $\vec{y}$ is part of the connected component "cc" (line 4). Also, a set of BDDs $\vec{c}$ is defined, wherein $\vec{c}$ includes those BDDs of $\vec{v}$ which have all their variables occurring in $\vec{y}$ (line 5).

If a variable var in $\vec{x}$ does not occur in any BDD of $\vec{v}$, this implies that the variable var is unconstrained by $\vec{v}$. In such a case, the set $\vec{c}$ will be empty (line 6) and a representative "TrueBdd" will be added to $\vec{c}$ specify that the var is unconstrained (line 7).

At line 8, for each connected component "cc" of the dependency graph D, the corresponding pair $(\vec{y}, \vec{c})$ is added to "C".

Finally, the set of components in "C" is returned at line 9.

Besides the above described simplification/decomposition methods 4a, various other conversion methods 4a designated to reduce the computational complexity of the configuration problem might as well be applied to R-BDDs 3.

To promote a more detailed understanding of the recursive "Build" method 4, an implementation example is given with reference to the complementary pseudo-code (the corresponding activities of the flow-chart of FIG. 7 are indicated in squared brackets for each line of the pseudo-code):

```
Build (x⃗,u⃗)                                                //[40]
//       The method takes a set of variables x⃗ and a set of BDDs u⃗ as
//       input, where the BDDs in u⃗ define the solution space over
//       the variables in x⃗
 1.  If (x⃗,u⃗) in Cache                                      //[41]
 2.       return Cache(x⃗,u⃗)                                 //[41a]
 3.  if |x⃗| = 1                                             //[42]
 4.       {p} := x⃗                                          //[43]
 5.       r := OR( { (p,a) | (u⃗ ∧ {p = a} ≠ false ), a ∈ dom(p) })   //[43]
 6.  else                                                    //[42]
 7.       v⃗ := Simplify(u⃗)                                  //[44]
 8.       C := Decompose(x⃗,v⃗)                              //[45]
 9.       If |C| > 1                                        //[46]
10.           R := AND({Build ( y⃗,c⃗ ) | ( y⃗,c⃗ ) ∈ C })   //[47]
11.       else                                               //[46]
12.           q := PickVariable(x⃗,v⃗)                       //[48]
13.           r := OR( {Build(x⃗, v⃗∪{q=a} ) | a ∈ dom(q)} )  //[48]
14.  Cache(x⃗,u⃗) := r                                       //[49]
15.  return r                                                //[49]
```

An exemplary execution of the "Build" method 4 will now be described based on the T-shirt example. It is referred to the above "Build" pseudo code and to FIGS. 8A to 11. While the "Build" method actually employs BDD-representations of the rules, tabular representations of the rules are thereby employed for the ease of discussion. The "Simplify" call (line 7) of the exemplary "Build" method employs the four different simplification methods introduced above, namely "Unary Constraint Propagation", "Split", "Merge Common Sub Support", and "All Neighbours Sync" as sub-calls.

Build($[b_1, b_2]$)

At line 1, the two Rule BDDs of the T-shirt problem, $[b_1, b_2]$ (see FIG. 1B), will not be in cache. Therefore, line 2 is skipped.

At line 3, $[b_1, b_2]$ is found to have more than one variable. Therefore, lines 4 and 5 are skipped and lines 6-7 are reached.

At line 7, $[b_1, b_2]$ does not change by applying any of the simplification methods.

At line 8, $[b_1, b_2]$ does not decompose to more than one component.

At line 9, $[b_1, b_2]$ is found to have only one component, i.e. one set of BDDs. As the corresponding dependency graph will have three nodes (one for each variable), and all the three nodes will be connected by the two rules $[b_1, b_2]$, the two rules form a single component. Therefore, lines 10 is skipped.

An OR-node is created at lines 11-13:

As the variable print is the only variable occurring in both inputs BDDs (see FIG. 5B), print is selected as branching variable for the OR-node creation by the "PickVariable" method.

Two recursive function calls Build($[b_1,b_2,(Print=MIB)]$) and Build($[b_1,b_2,(Print=STW)]$) are made at the line 13. The result of both of the calls will be added as child nodes of the new OR-node.

Build($[b_1,b_2,(Print=MIB)]$)

At line 1, $[b_1,b_2,(Print=MIB)]$ will not be in cache. Therefore, line 2 is skipped.

At line 3 $[b_1,b_2,(Print=MIB)]$ is found to have more than one variable. Therefore, lines 4 and 5 are skipped and lines 6-7 are reached.

At line 7, the "Simplify" call calls the sub-methods "Unary Constraint Propagation", "Split", "Merge Common Sub Support", and "All Neighbor Sync":

"Unary Constraint Propagation" will employ the unary constraint (Print=MIB) and remove all combinations from the tabular rules of FIG. 1B not including (Print=MIB). FIG. 8A shows the remaining combinations of the rules of FIG. 1B after applying "Unary Constraint Propagation". $b_1$ only has one valid combination left, while $b_2$ has three valid combinations left.

"Split" will break each of $b_1$ and $b_2$ into two. As result, four single constraints are obtained, as can be seen in FIG. 8B.

Figures 8A, 8B, 8C:
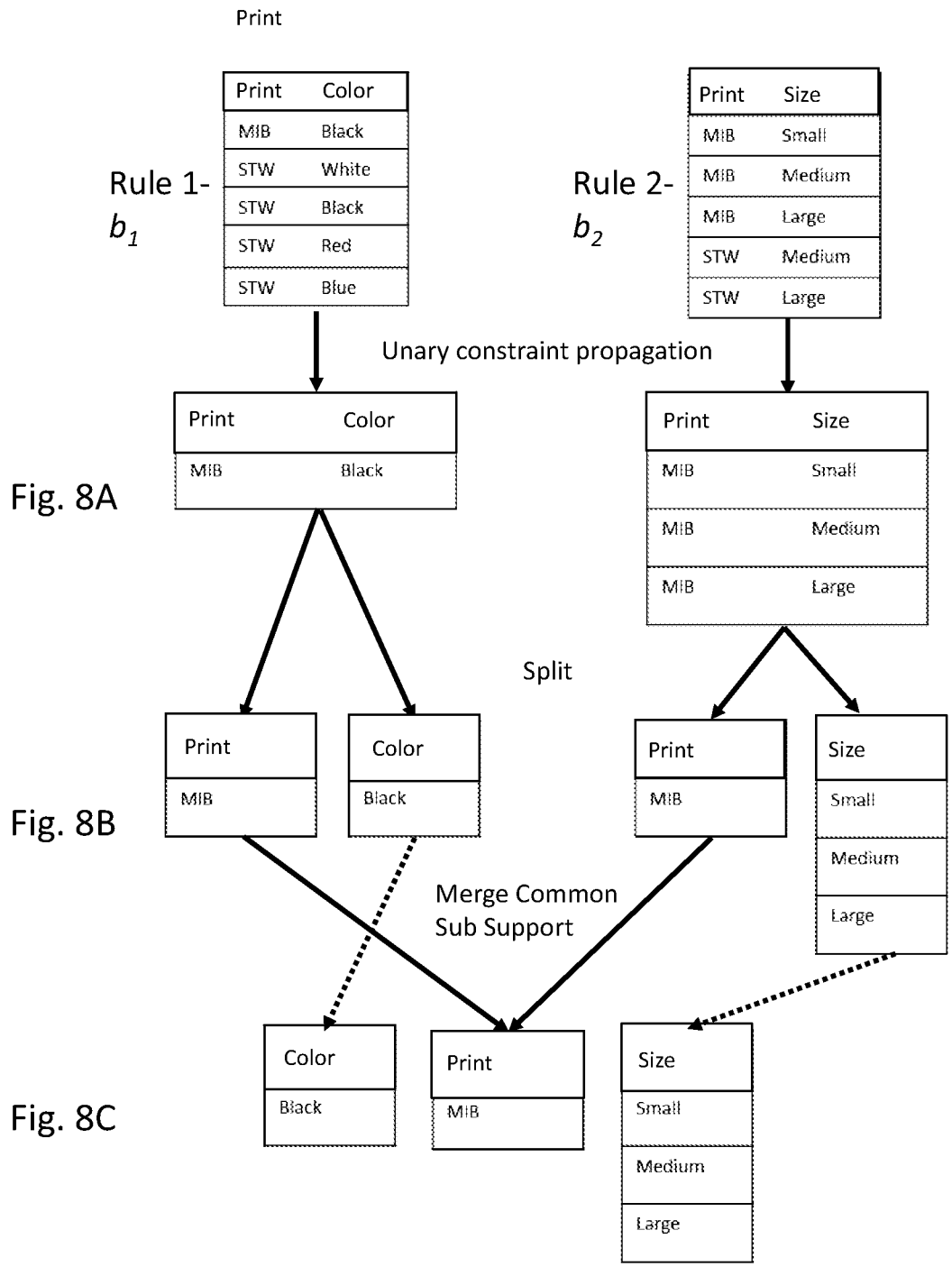

"Merge Common Sub Support" will merge the two identical constraints (Print=MIB), as can be seen in FIG. 8C. Three single constraints are left.

"All Neighbor Sync" will not have any effect on the constraints, as they do not share any variables.

Consequently, the three constraints shown in FIG. 8C will be the output of the "Simplify" call of line 7.

At line-8, the Decompose method will decompose the input set with three rules into three sets, each set having one rule, as all the rules don't share a variable between them. Hence the resulting set |C| will have three components in it.

As |C|>1 (line 9), an AND-node will be generated at line 10, which has three child-nodes representing the three constraints shown in FIG. 8C.

Figure 9A:
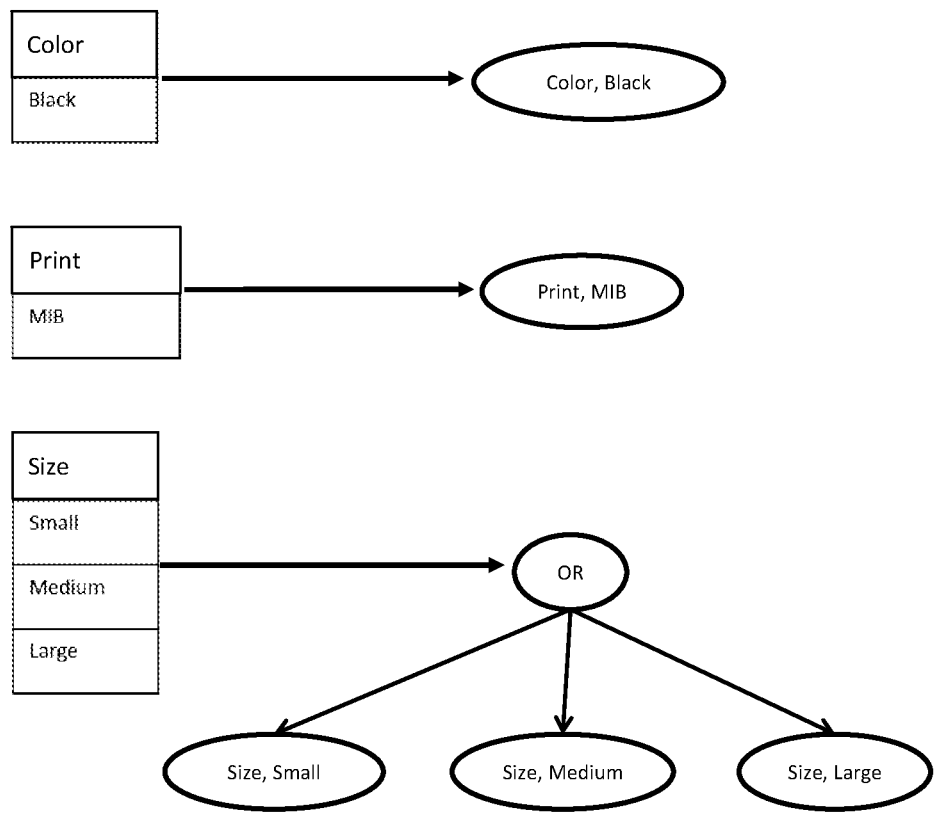
Figure 9B:
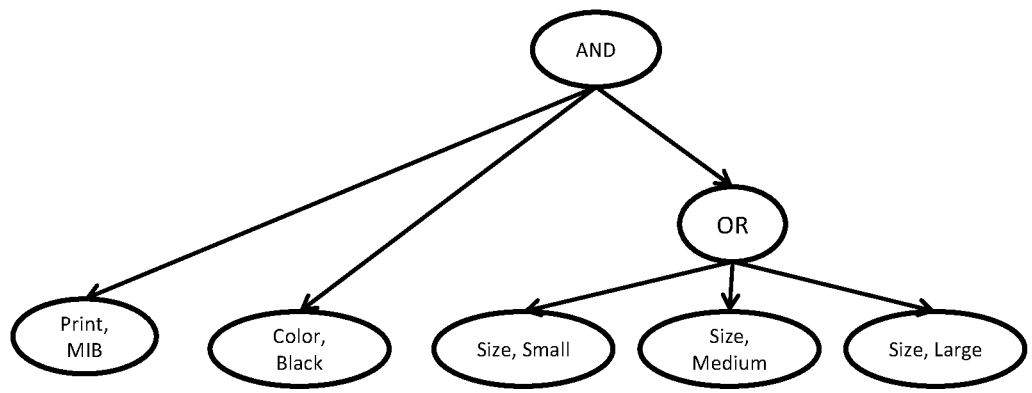

Note: The three constraints all only have a single dependent variable. Hence, for each of the recursive "Build" calls corresponding to the three constraints, DAOG structures will be build at lines 4-5 of the "Build"-method and be returned. The DAOG structures generated for each of the three constraints are shown in FIG. 9A. The three nodes of FIG. 9A will be added as child nodes below the AND node generated by the Build($[b_1,b_2,(Print=MIB)]$)

method. The complete DAOG of the Build([$b_1,b_2$, (Print=MIB)]) method is shown in FIG. 9B.

The complete DAOG generated by the Build([$b_1,b_2$, (Print=MIB)]) method is returned to the Build([$b_1, b_2$]) method and added as a child node below the OR-node of the Build([$b_1, b_2$]) method.

Build([$b_1,b_2$,(Print=MIB)]) is finished; Build([$b_1,b_2$, (Print=STW)]) is called subsequently.

Build([$b_1,b_2$,(Print=STW)])

Figure 10:
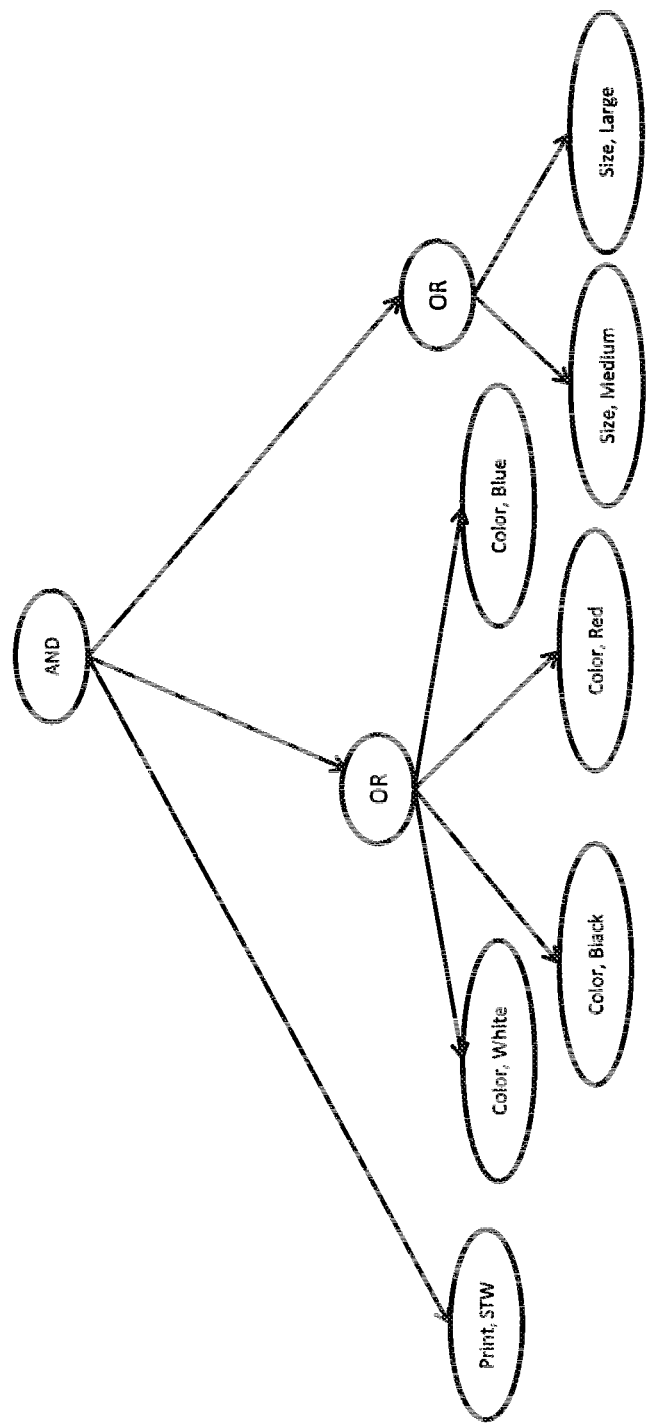

This method employs the same routine as the Build([$b_1$, $b_2$,(Print=MIB)]) method described above. The resulting DAOG, which is shown in FIG. 10, is added as a second child node below the OR-node of the Build([$b_1$, $b_2$]) method.

Figure 11:
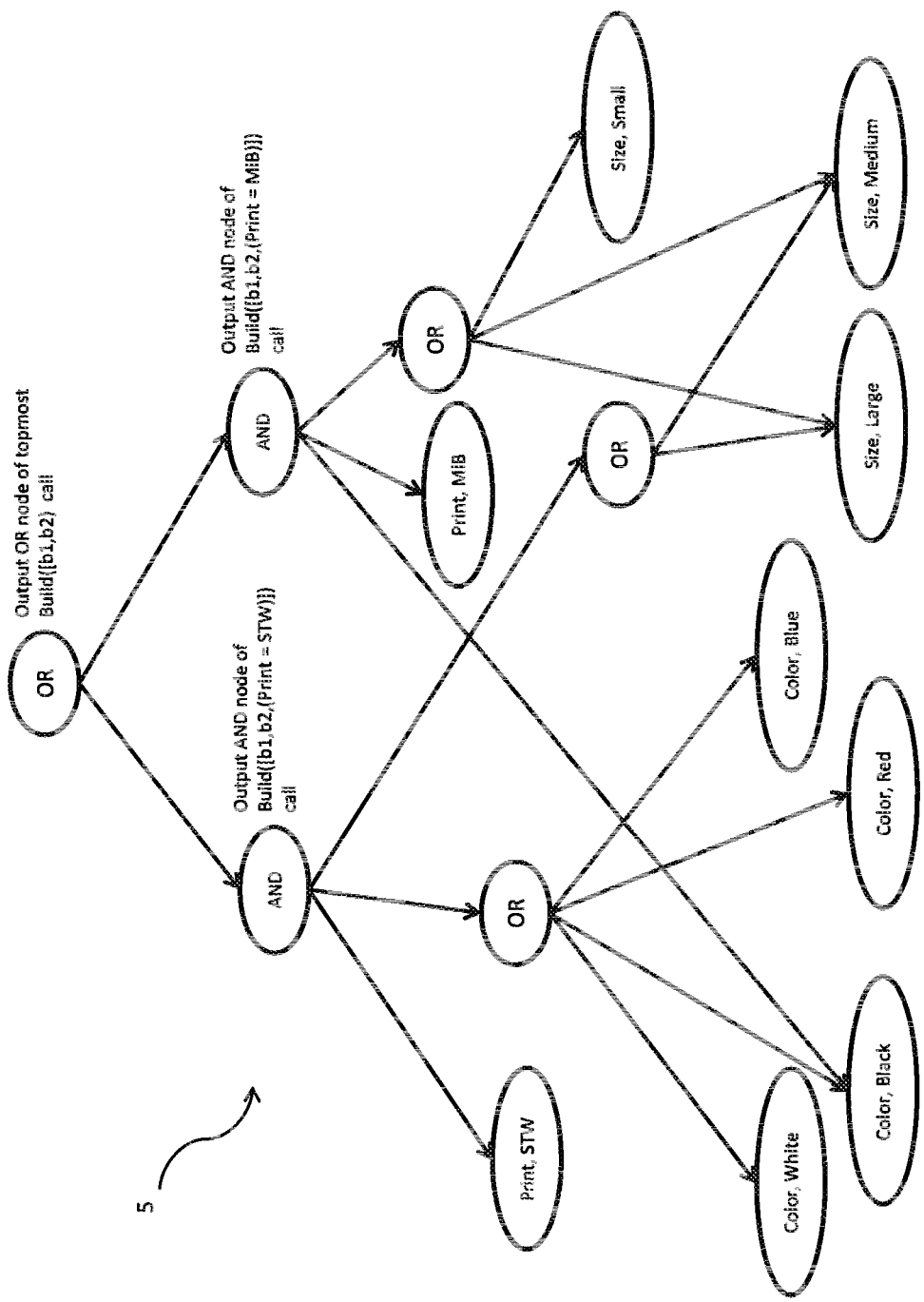
Figure 14:
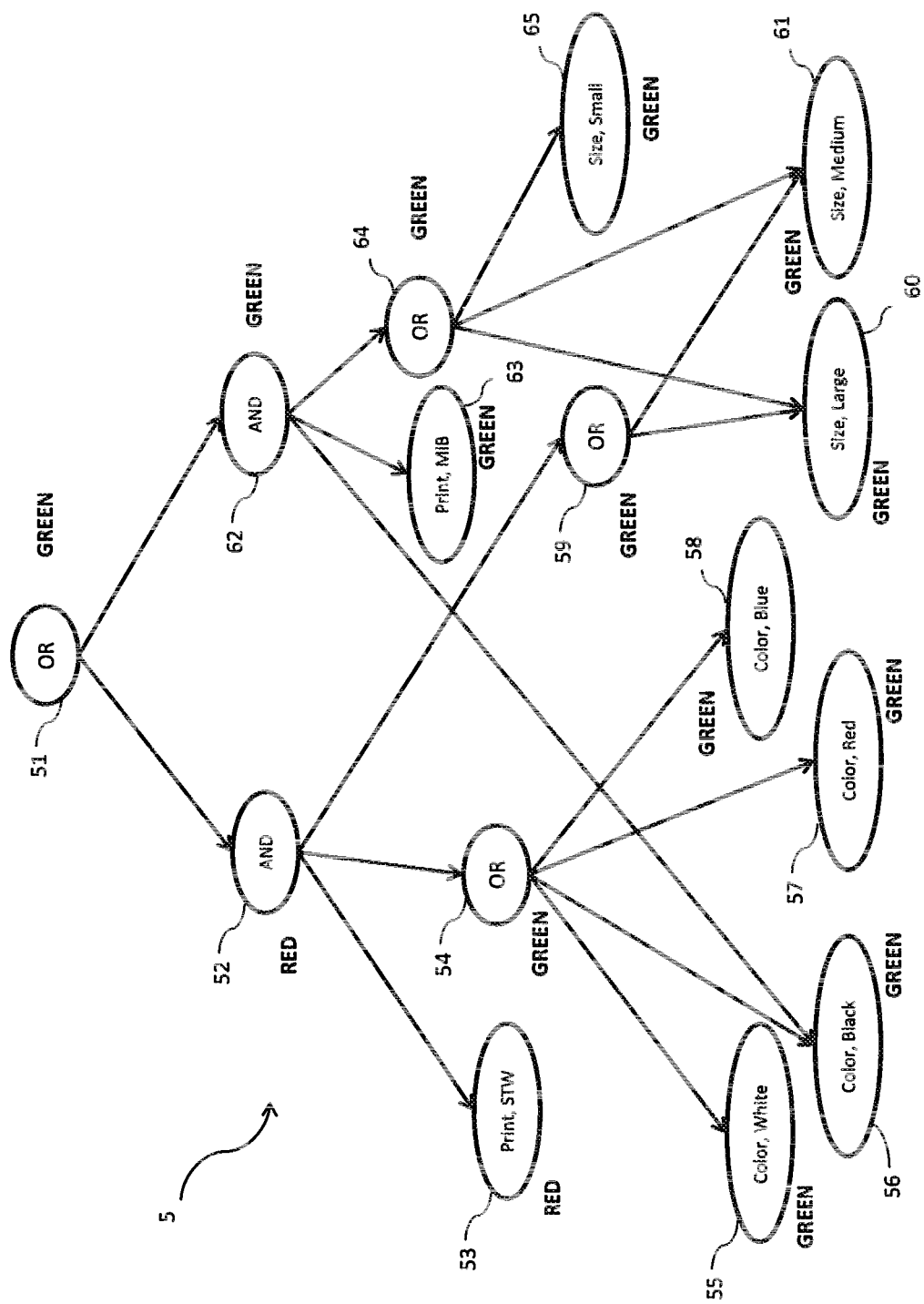
FIGS. 14 to 17 illustrate an exemplary traversal of the example DAOG of FIG. 11 during the iterative configuration phase.
Figure 15:
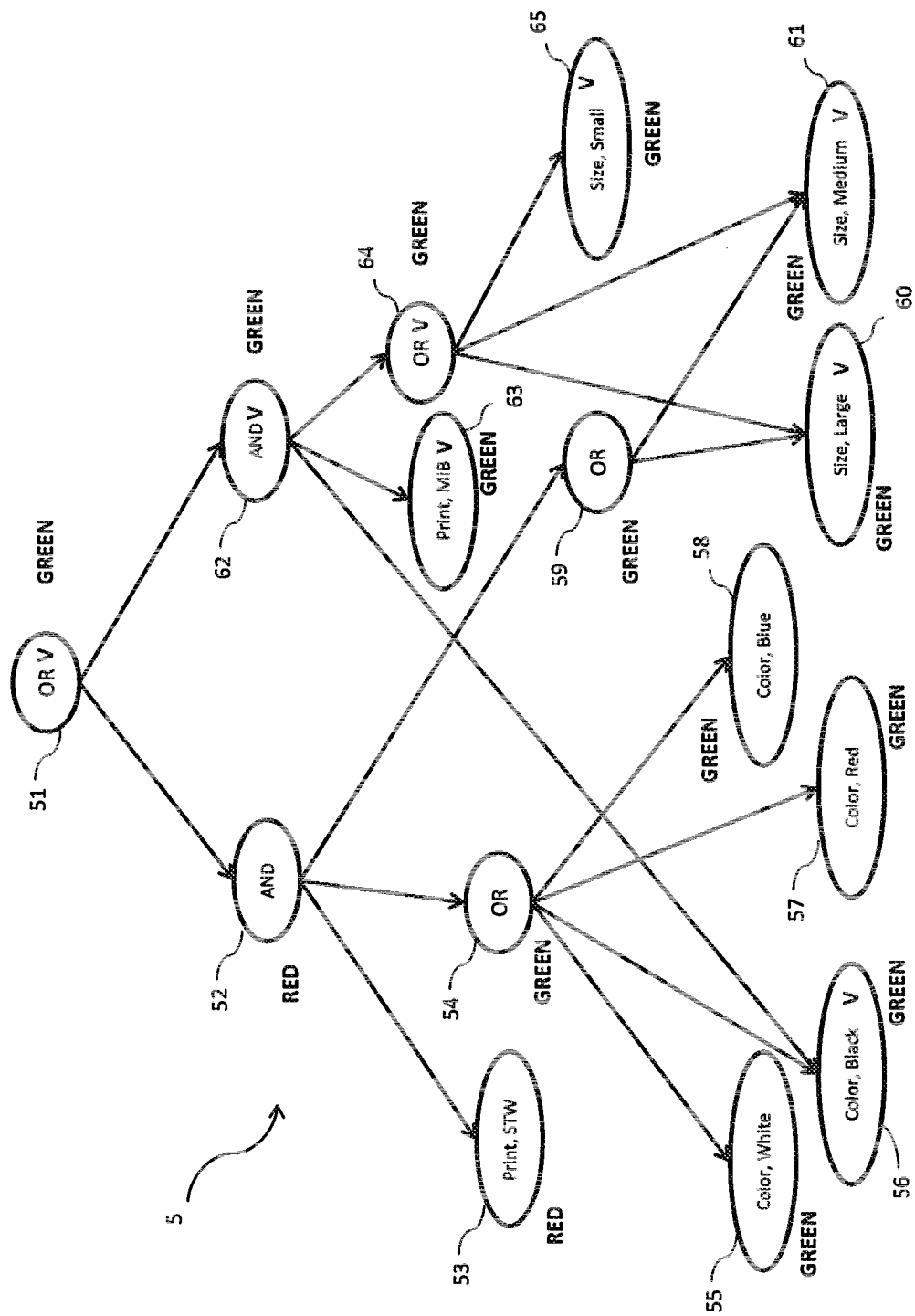

The complete DAOG-structure generated by the Build ([$b_1$, $b_2$]) method, which includes the two DAOG-structures of the Build([$b_1,b_2$,(Print=MIB)]) method and the Build([$b_1$, $b_2$,(Print=STW)]) method as child nodes, is shown in FIG. 11.

The DAOG of FIG. 11 representing the product model of the exemplary T-shirt configuration problem is rather simple in its complexity. Therefore, there is no need to employ Boolean-logic transformations 4b during the generation of the DAOG 5 and/or on the generated DAOG 5. However, for more complex configuration problems it might be useful to employ such Boolean-logic transformations 4b in order to reduce the size of a DAOG 5.

In the following, in order to illustrate the mechanisms of the DAOG optimization by using Boolean-logic transformations 4b, two exemplary methods of Boolean-logic based transformations 4b are presented, namely "Single use AND/OR-Optimization" and "AND/OR common children Optimization".

Single Use AND/OR-Optimization

If an internal node of a DAOG 5 has only one single parent node, and if that parent node is of the same type as the internal node (i.e. both nodes are AND-nodes, or both nodes are OR-nodes), both the parent node and the internal (child) node can be merged. In this context, merging two nodes means that all outgoing edges of the child node become outgoing edges of the parent node. Thereby, the child node itself becomes redundant and is removed. As a consequence, both the node-count as well as the edge count of the respective DAOG are reduced by 1. For large DAOGs, the repeated application of the "Single use AND/OR-Optimization" can result in a size reduction of 10% to 15%, or even more.

The "Single use AND/OR-Optimization" is further explained with reference to FIGS. 12A-12C. The table of FIG. 12A displays the solution space of an exemplary configuration problem, which has the six variables, namely A, B, C, D, E, and F. In total, the solution space comprises two valid combinations of values for the six variables, which are (3, 1, 3, 1, 1, 1) and (5, 1, 1, 1, 1, 1). FIG. 12B shows a DAOG structure representing the solution space of the configuration problem of FIG. 12A. The DAOG of FIG. 12B can be optimized by using the "Single use AND/OR-Optimization", as the AND-node of the DAOG of FIG. 12B denoted as "Child AND-node" has only a single parent node (denoted as "Parent AND-node"), which is an AND node as well. By applying the "Single use AND/OR-Optimization" to the DAOG, i.e. by attaching all the outgoing edges of the "Child AND-node" directly to the "Parent AND-node" and subsequently removing the "Child AND-node" from the DAOG, an optimized DAOG structure is obtained, which is shown in FIG. 12C. The optimized DAOG structure has both one node (13 nodes→12 nodes) and one edge (12 edges→11 edges) less than the DAOG structure of FIG. 12B.

AND/OR Common Children-Optimization

This optimization method might be employed if at least two nodes of an identical type (i.e. two AND-nodes, or two OR-node) share at least a certain number of child nodes, i.e. if the at least two nodes of an identical type have a sufficient number of outgoing edges to identical child nodes. A sufficient number of shared child nodes might be in the range of 10-15, depending on the details of the particular DAOG implementation.

The "AND/OR common children Optimization" employs the following routine:

Detect at least two nodes of an identical type, which share a sufficient number of child nodes;

Create a new node of the identical type, which has the shared child nodes of the at least two nodes of the identical type as child nodes as well;

Remove all outgoing edges from the at least two nodes of the identical type to the shared child nodes;

Add an outgoing edge from each of the at least two nodes of the identical type to the new node of the identical type; this means that the new node of the identical type becomes a child node of the at least two nodes of the identical type.

By applying the "AND/OR common children Optimization" to a DAOG 5, the number of nodes of the DAOG increases by 1 due to the addition of the new node of the identical type. However, the numbers of edges of the DAOG 5 decreases. The magnitude of the decrease in edges depends on the number of shard child nodes of the at least two node of the identical type. If the number of edges is sufficiently reduced, the increase in nodes is overcompensated and the total size of the DAOG 5 is therefore reduced. Depending on the details of the DAOG implementation, a reduction of approximately 10 edges is required in order to compensate the additional node. For large DAOGs the repeated application of the "Single use AND/OR-Optimization" can result in a DAOG size reduction of up to 75%, or even more.

The "AND/OR common children-Optimization" is further explained with reference to the identical exemplary configuration problem used above to explain the "Single use AND/OR-Optimization". The table of FIG. 13A again displays the solution space of said configuration problem. However, this time a different DAOG structure, shown in FIG. 13B, is used to represent the solution space of said configuration problem. The DAOG of FIG. 13B can be optimized with the help of "AND/OR common children Optimization", as the two AND-nodes of said DAOG share a sufficient number of child nodes (for the example of FIGS. 13A-13C, it is assumed that four shared nodes is a sufficient number). By applying the "AND/OR common children-Optimization" to the DAOG of FIG. 13B, i.e. by applying the above described routine, an optimized DAOG structure is obtained, which is shown in FIG. 13C. The optimized DAOG structure has one more node (11 nodes→12 nodes), but its edge-count is reduced by two (14 edges→12 edges). Here, it shall be noted that a reduced edge count of two might not be sufficient for the advantageous application of the "AND/OR common children-Optimization" in terms of DAOG size. However, the above example serves mainly the purpose of illustrating the general mechanism of the "AND/OR common children-Optimization" method.

The DAOG of FIG. 11 representing the product model of the T-shirt configuration problem is used as the basis for the iterative setting of values 6, some embodiments of which will now be described with reference to FIGS. 14 to 22, again referring to the exemplary T-shirt product model.

After the DAOG 5 has been established, the user or an automated process will proceed with iteratively picking and setting values for the variables of the product model (activity 6 in FIGS. 3 and 4). Within one iteration, values for one or more variables may be set, whereas exactly one value is set for each variable. This results in at least one variable-value pair selected. In response to setting this at least one variable-value pair, the DAOG 5 is utilized in order to determine the current status of the configuration method. More specifically, the DAOG 5 is used to process the input variable-value pairs to examine whether or not the resulting partial configuration 7 is valid. If the partial configuration 7 is valid, the DAOG is supplemented by control information to restrict the product model to the found valid partial configuration 7 by removing variable-value pairs not yet included in the found valid configuration which have become inadmissible due to the selected variable-value pairs of the found valid configuration.

This removal is, for example, performed by a color-marking algorithm (cf. FIGS. 14 and 15) as follows:

In response to setting at least one variable-value pair, a depth first process marks each node of the DAOG 5 as RED or GREEN, depending upon whether or not the part of the solution space represented by a particular node is dependent on the at least one selected variable-value pair. In other words, each node of the DAOG 5 still complying with the rules of the product model after the at least one variable has been restricted to the at least one variable-value pair shall be marked GREEN, all others RED. This is achieved for the various types of nodes in the DAOG 5 as follows:

All the terminal nodes representing variable-value pairs of the at least one variable which have not been selected are marked RED. All other terminal nodes are marked GREEN.

AND-nodes (root node and internal nodes) are marked GREEN if all child-nodes of the AND-node are GREEN. Otherwise, an AND-node is marked RED.

OR-nodes (root node and internal nodes) are marked GREEN if at least one child-node is GREEN. Otherwise, an OR-node is marked RED.

After this marking has been done, the DAOG 5 undergoes a second depth-first traversal in order to determine the admissible remaining variable-value pairs outside the current partial configuration:

Each node which can be reached solely via GREEN nodes are marked as visited.

All other nodes, i.e. the RED nodes themselves and node which would only be reachable via RED nodes, are not marked.

All terminal nodes being marked as visited represent further admissible variable-value pairs which may still be selected to form subsequent valid partial configurations or a valid complete configuration.

An example of this process is given by FIGS. 14 to 17, again referring to the T-shirt product model and the exemplary DAOG of FIG. 11. At the first iteration, a user selects the option Print=MIB. This excludes the alternative option Print=STW. As a consequence, during the first depth-first traversal of the DAOG 5, the terminal node 53 representing the excluded variable-value pair Print=STW is marked RED. As a further consequence of this, the parent node 52 of the terminal node 53 is also marked RED because it is an AND-node and one of its child nodes (node 53) has been marked RED. All other nodes are marked GREEN (see FIG. 14).

Subsequently, the second depth first traversal determines the admissible remaining variable-value pairs. The second depth first traversal starts with the left-hand branch of DAOG 5 including the nodes 52 to 61. The terminal node 53 (representing Print=STW) is marked RED itself and therefore cannot be reached. This variable-value pair is thus inadmissible. Furthermore, as the parent node 52 of node 53 is also marked RED, its child nodes and grand-child nodes cannot be reached via this route. Hence, the four terminal nodes 55, 56, 57, 58 representing the four color options (white, black, red and blue) are, at this stage, not marked as visited. The same applies to the two size options which are represented by the two terminal nodes 60, 61 as well as their parent node 59. Within the left-hand branch of DAOG 5, these nodes are children or grand-children of RED-marked node 52 and thus cannot be reached over node 52. However, some of these terminal nodes can still be reached via the right-hand branch of the DAOG 5, accessible via the AND-node 62. In this right-hand branch of the DAOG 5, all internal nodes 62 and 64 have been marked GREEN. Consequently, the terminal node 56 (representing Color=Black) and all Size nodes 60, 61 and 65 can still be reached over the right-hand branch. These terminal nodes are therefore marked as visited. The same is, of course, true for child node 63 representing the option Print=MIB selected during the first iteration. All remaining terminal nodes 55, 57, 58 representing the other color options White, Red and Blue remain unreachable and are therefore not marked (see markings "V" in FIG. 15).

Thus, at the first iteration of the value setting, the configuration is in the following state:

current valid partial configuration: Print=MIB;

further admissible variable-value pairs (not being part of the current partial configuration): Color=Black; Size=Small; Size=Medium; Size=Large;

further inadmissible variable-value pairs excluded by the variable-value pair setting: Print=STW; Color=White; Color=Red; Color=Blue.

Figure 16:
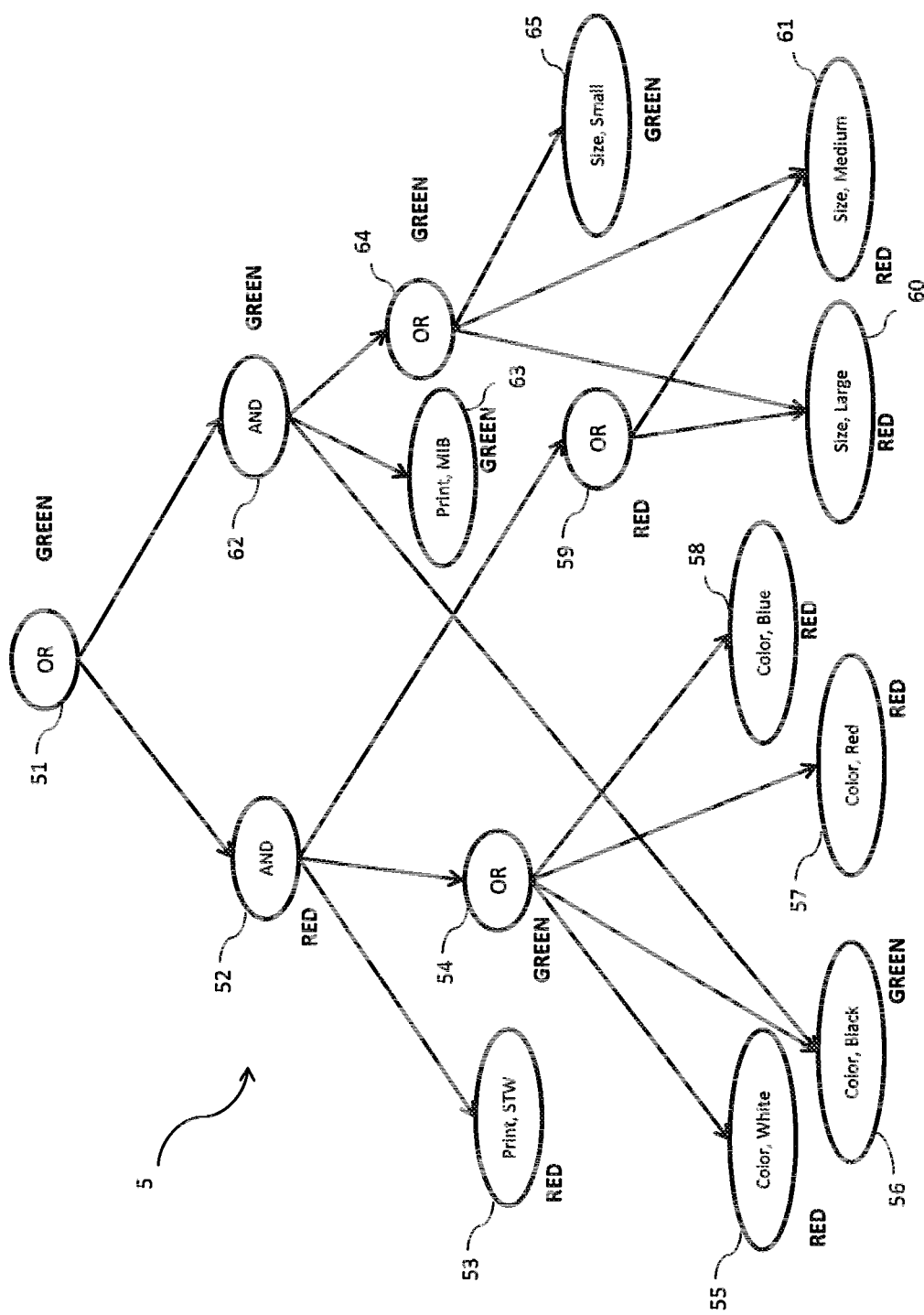
Figure 17:
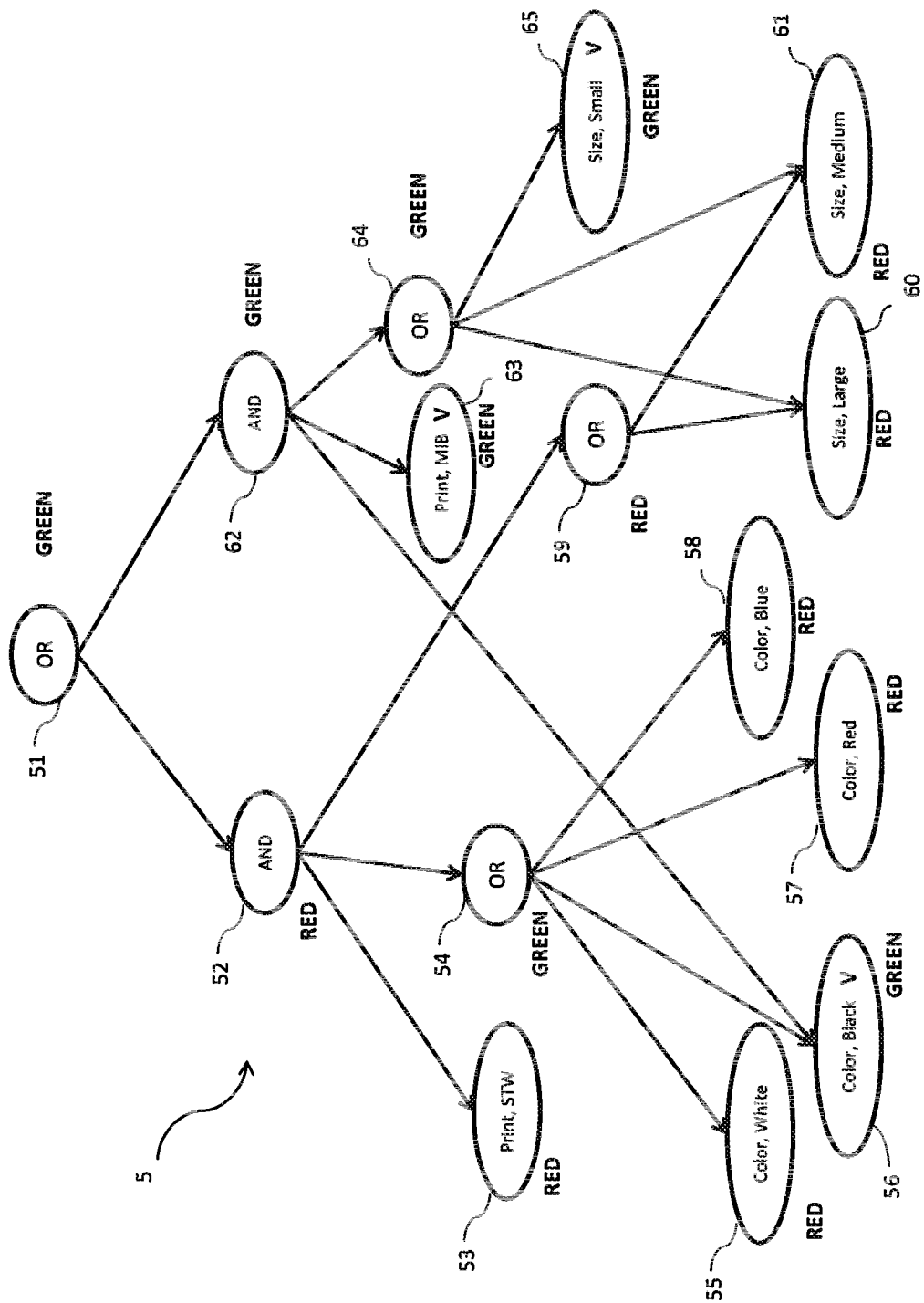

FIGS. 16 and 17 show a second iteration which is started by the user (or an automated process) selecting the variable-value pair Size=Small. Again, two depth first traversals of the DAOG 5 are performed. During the first traversal, the terminal nodes 60, 61 representing the Size options not selected (i.e. Size=Medium; Size=Large) are marked RED because they are excluded by the selected option Size=Small. As a consequence, the OR-node 59 being the parent of the two excluded Size options is also marked RED (FIG. 16).

The second depth first traversal then collects the nodes which are reachable via GREEN nodes. These are the terminal node 63 (representing Print=MIB), terminal node 65 (representing Size=Small) and terminal node 56 (representing Color=Black) (cf. FIG. 17).

Hence, at this point, the configuration process is in the following state:

current valid partial configuration: Print=MIB, Size=Small;

further admissible variable-value pairs (not yet being part of the current partial configuration): Color=Black;

further inadmissible variable-value pairs excluded by the variable-value pair setting: Print=STW; Color=White; Color=Red; Color=Blue; Size=Medium; Size=Large.

In terms of memory usage and computer resources requirements, this algorithm utilizing the DAOG representation is generally more efficient than determining the state of a current partial configuration 7 based on a ToBDD as hitherto done in the prior art. The two depth first traversal of the DAOG 5 can be performed with a computational effort proportional to the number of nodes and edges (time complexity: O (nodes+edges)). The amount of memory required to maintain the color and visited markings is limited (for example, the visited flag only requires one bit per node, the color coding requires two bits per node, if two colors and an uncolored state are used).

Figure 18:
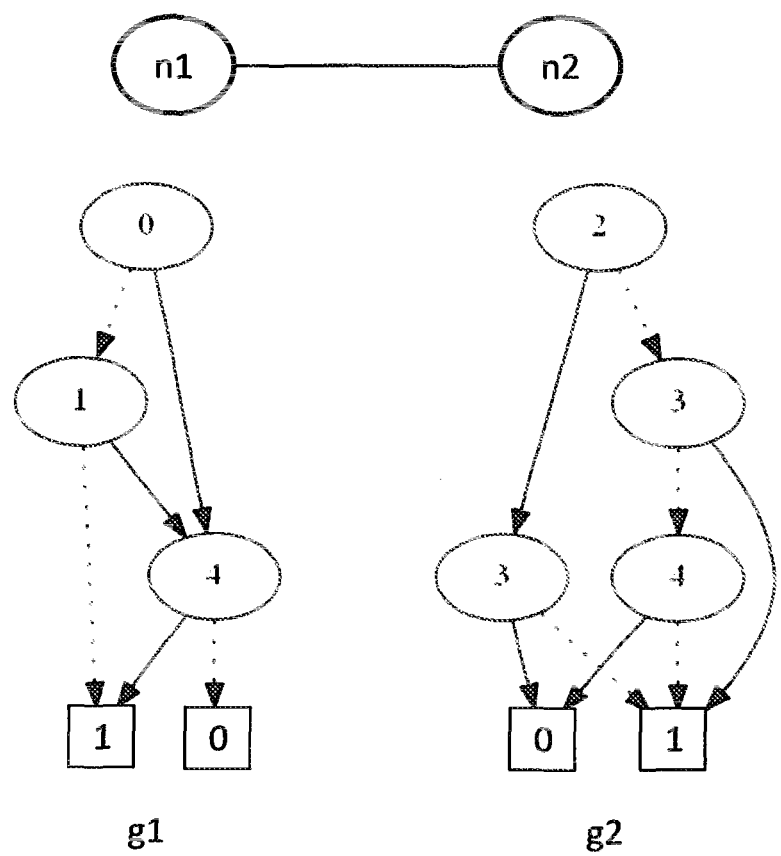
FIG. 18 shows a ToBDD example.
Figure 19:
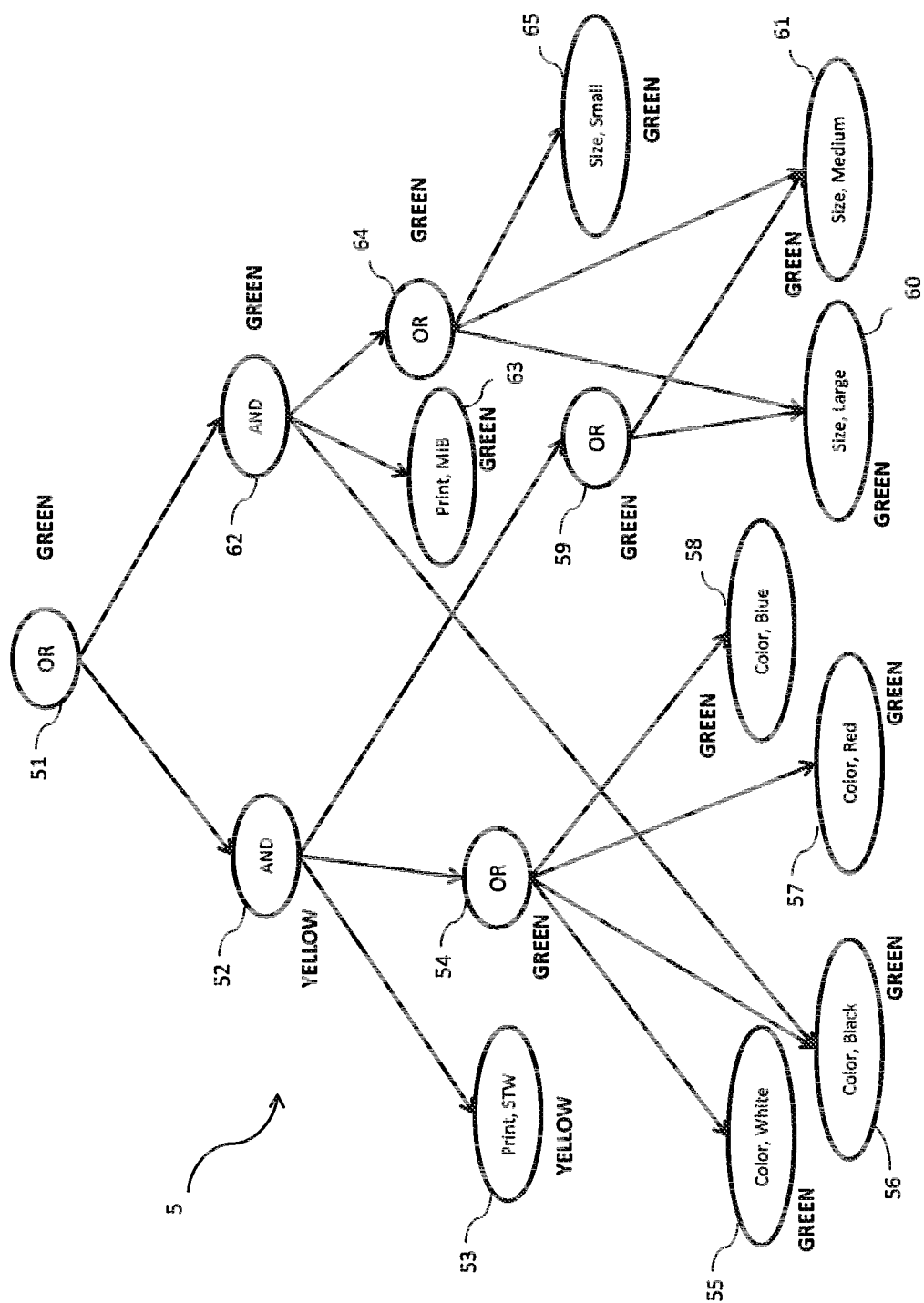
FIGS. 19 to 22 illustrate a determination of free alternative variable-value pairs based on the example DAOG of FIG. 11.
Figure 20:
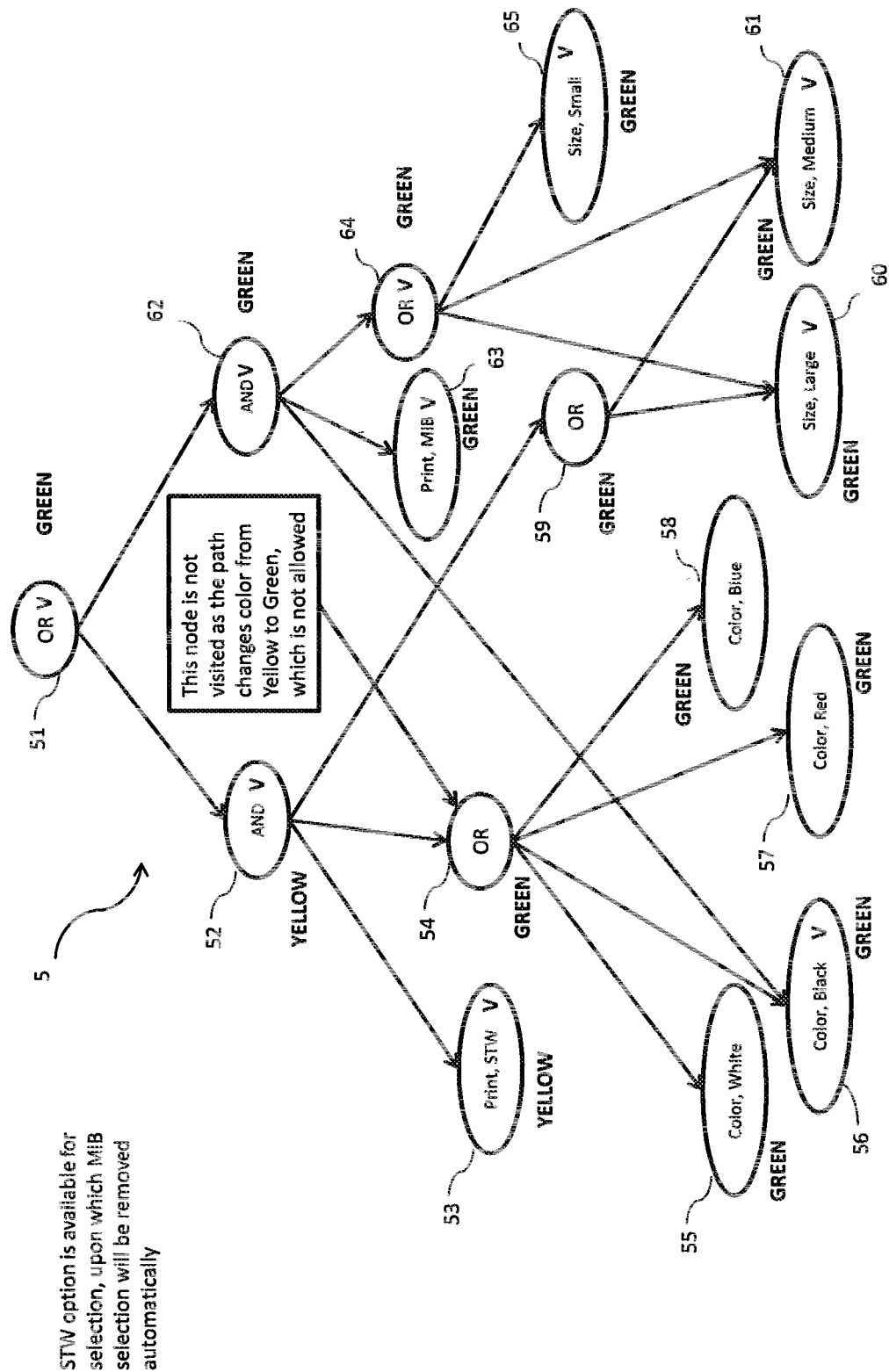
Figure 21:
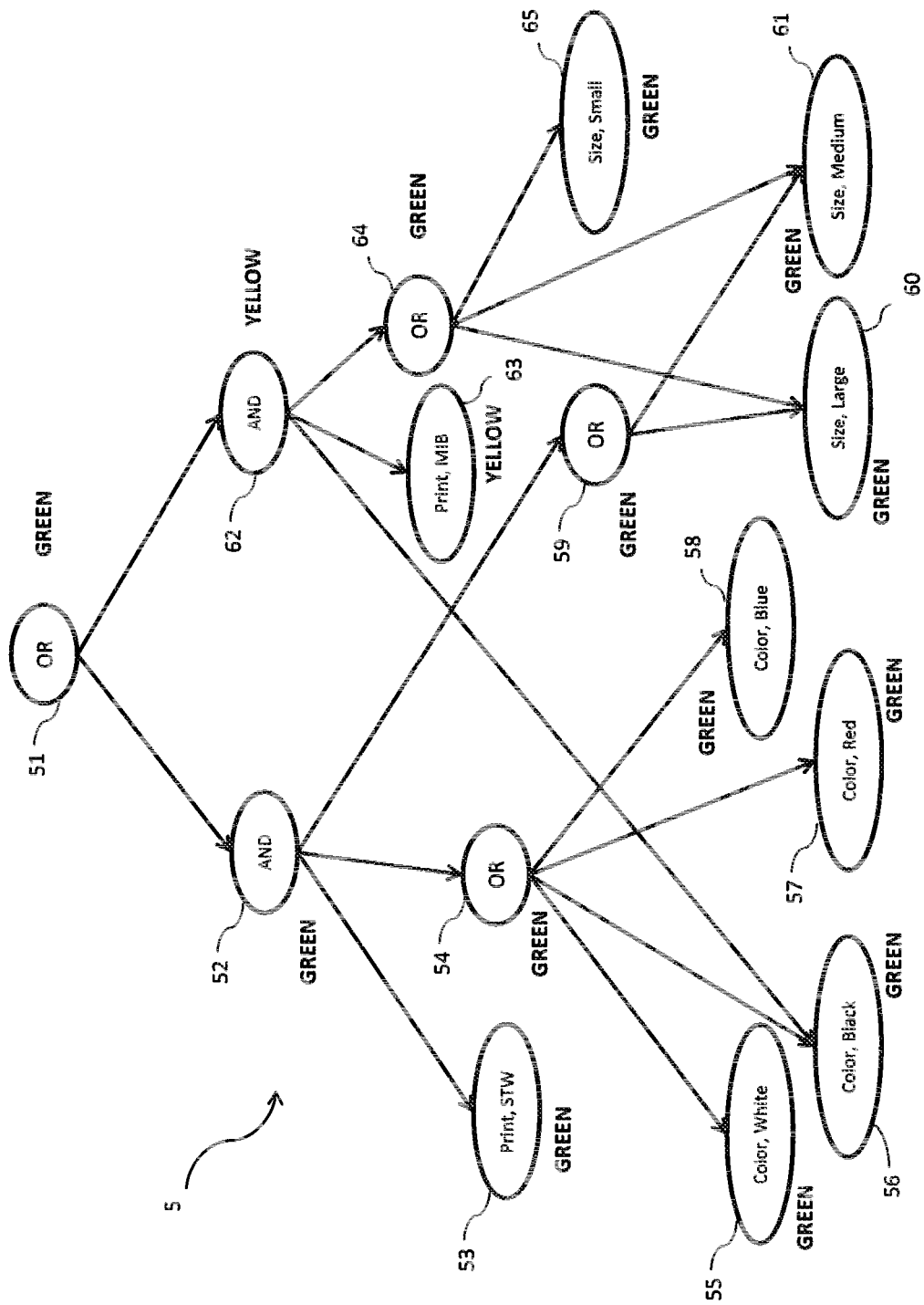
Figure 22:
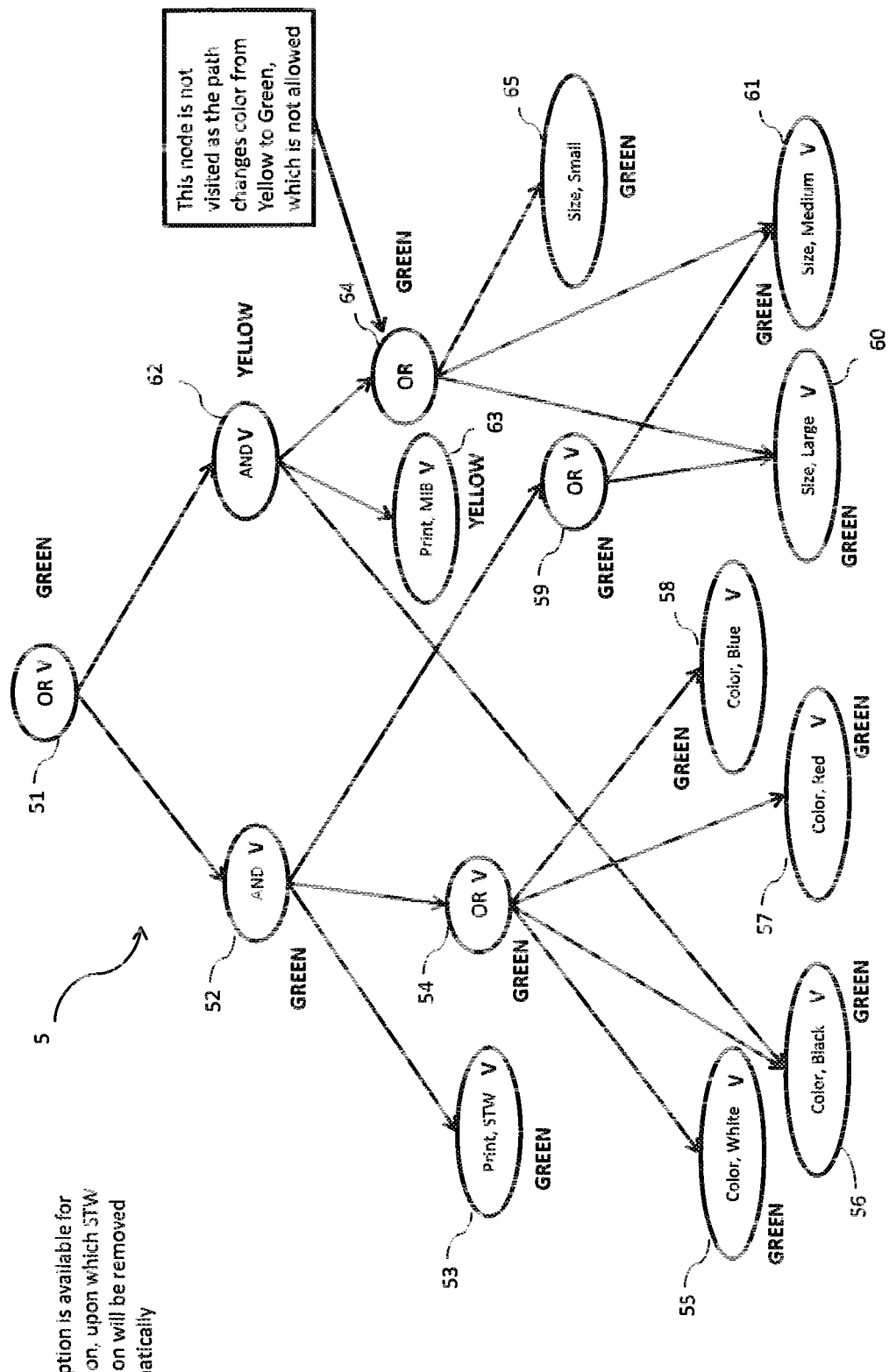

In contrast to this, a determination of further admissible variable-value pairs on the basis of a ToBDD structure is structurally more costly. This lies in the fact that the ToBDD associates R-BDDs, each R-BDD associating a limited number of variables (e.g. two variables) and multiple R-BDDs defining relations for a particular variable. Hence, the relationship of one particular variable to other variables is generally distributed over more than one ToBDD node (cf. FIG. 18 showing a very simple ToBDD structure of the T-shirt example, the ToBDD containing two nodes n1 and n2 representing the BDDs $g_1$ and $g_2$, respectively). As a consequence, various R-BDDs have to be synchronized which requires, on the one hand, complex logical operations such as BDD projections, BDD join and BDD co-join operations. For example, two R-BDDs defining different constraints for a particular variable (cf. again FIG. 18 indicating that the relations of the variable Print to the other two variables are defined by ToBDD nodes n1 and n2) have to be synchronized in order to create the pre-requisites for determining which values of the particular variable are still admissible. These R-BDD synchronization operations require both, a substantial amount of memory (both, the original as well as intermediate and the synchronized R-BDD versions have to be stored) as well as a substantial amount of computing power. Moreover, the traversal of ToBDD structures is more complex. For example, during synchronization, recursive depth-first traversals have to be performed due to the binary encoding of the variables.

The process of determining the current status of the configuration method of FIG. 4 may be further refined in order to provide a more significant feed-back to the user performing the iterative configuration 6. For example, the user may not only be interested in the fact whether or not his/her selected particular configuration 7 is valid and in further admissible variable-value pairs, but also in undo options for which s/he could choose alternative values for an already selected variable-value pair without raising the necessity to re-configure other variables. Such independent alternative variable-value pairs have already been introduced above as 'free' variable-value pairs. Hence, processing the DAOG 5 in response to setting at least one variable-value pair during activity 6 may include a determination of free variable-value pairs. This can be realized by introducing another color (e.g. YELLOW) and a more refined marking during the first depth first traversal:

A terminal node is marked
  GREEN if it relates to variables which have not yet been set (i.e. which are outside the current partial configuration 7) or if it represents an already selected variable-value pair.
  YELLOW, otherwise.
An AND-node is marked
  GREEN if all child nodes are GREEN;
  else YELLOW if one child node is YELLOW and all other child nodes are GREEN;
  else RED.
An OR-node is marked
  GREEN if at least one child node is GREEN;
  else YELLOW if at least one child node is YELLOW;
  else RED (i.e. all child nodes are RED).

During the second depth first traversal of the DAOG 5, the nodes are marked as visited in the following manner:
  All GREEN nodes are marked as visited if a path to reach them exists (starting at the root node) which only includes GREEN nodes.
  A YELLOW node is marked as visited if the path starting from the root node initially includes at least one GREEN node (i.e. at least the root node and potentially further subsequent nodes) and the path turns to subsequent YELLOW nodes at some point until the YELLOW node considered is reached. Note that a YELLOW node is not marked as visited if the path, after having turned to YELLOW, switches back to GREEN again before reaching the YELLOW node considered.

All terminal nodes marked as visited in this manner represent the further admissible variable-value pairs (still outside the current partial configuration 7) or the free alternative variable value pairs.

An example of this refined process 6 is given by FIGS. 19 to 22, again referring to the T-shirt example. Again, the user has started the iterative configuration 6 on the basis of the DAOG 5 by selecting Print=MIB (represented by terminal node 63). The other option for Print, Print=STW (represented by terminal node 53) is marked as YELLOW. As a consequence, parent AND-node 52 is also marked to be YELLOW because it has one YELLOW child-node (node 53) and two GREEN child nodes (nodes 54 and 59). All other nodes are marked as GREEN (cf. FIG. 19) for the same reasons outlined above with reference to FIG. 14.

During the second depth first process of DAOG 5, the nodes 51, 52, 53, 56, 62, 63, 64, 60, 61 and 65 are marked as visited. GREEN-marked nodes 60 to 65 can be reached solely via other GREEN nodes. YELLOW-marked Node 53 can be reached via GREEN-YELLOW path given by nodes 51-52-53 and as therefore also marked as visited. The same applies to parent node 52. The other two child nodes of YELLOW-marked node 52, however, GREEN-marked OR-node 54 and GREEN-marked OR-node 59, cannot be reached anymore because the GREEN-YELLOW path given by nodes 51-52 now turns GREEN again. As a consequence, also terminal nodes 55, 57 and 58 are not reachable and, thus, not marked as visited (cf. FIG. 20).

Hence, at this point, the configuration process is in the following state:
  current valid partial configuration: Print=MIB;
  further admissible variable-value pairs (not being part of the current partial configuration): Color=Black; Size=Small; Size=Medium; Size=Large;
  free alternative variable-value pair: Print=STW;
  further inadmissible variable-value pairs excluded by the current variable-value pair setting: Color=White; Color=Red; Color=Blue.

This information may be presented to the user in response to the first iteration setting Print=MIB and the subsequent processing of the DAOG 5.

During the next (second) iteration of process 6, the user could, for example, switch from Print=MIB to Print=STW. In this case, the previously selected variable-value pair Print=MIB will be removed from the partial configuration 7. Following the procedure outlined before, this is achieved by re-processing the DAOG 5 resulting in nodes 52 and 53 be marked as GREEN, while node 63 (representing the de-selected variable-value pair Print=MIB) and parent 62 are marked as YELLOW (see FIG. 21). As a result, all nodes except nodes 64 and 65 can be visited during the second depth first iteration. Node 64 and its child node 65 (representing the variable-value pair Size=Small) cannot be reached anymore as the path towards them turned from GREEN to YELLOW at AND-node 62 and re-switching to GREEN again is not allowed.

Hence, at this point, the configuration process is in the following state:
current valid partial configuration: Print=STW;
further admissible variable-value pairs (not being part of the current partial configuration): Color=White; Color=Black; Color=Red; Color=Blue; Size=Medium; Size=Large;
free alternative variable-value pair: Print=MIB;
further inadmissible variable-value pairs excluded by the current variable-value pair setting: Size=Small.

For this refined processing of iterative variable-value pair settings, the DAOG representation is structurally superior over the ToBDD representation (in terms of memory usage and computing resource requirements) for the same reasons as outlined above with reference to FIG. 18.

The DAOG representation can also be used to implement further useful functions during the iterative process 6. For example, it could be of interest which variable-value pairs of the current valid partial configuration 7 would have to be reset (i.e. de-selected) in order to render inadmissible variable-value pairs admissible. Such inadmissible variable-value pairs can only become admissible variable value pairs if the conflicting variable-value pairs of the valid partial configuration 7 are removed from the valid partial configuration. Hence, the DAOG 5 may be processed in order to determine these variable-value pairs of the current valid partial configuration 7 which need to be removed from the valid partial configuration in order to render a particular inadmissible variable value pair admissible.

Figure 23:
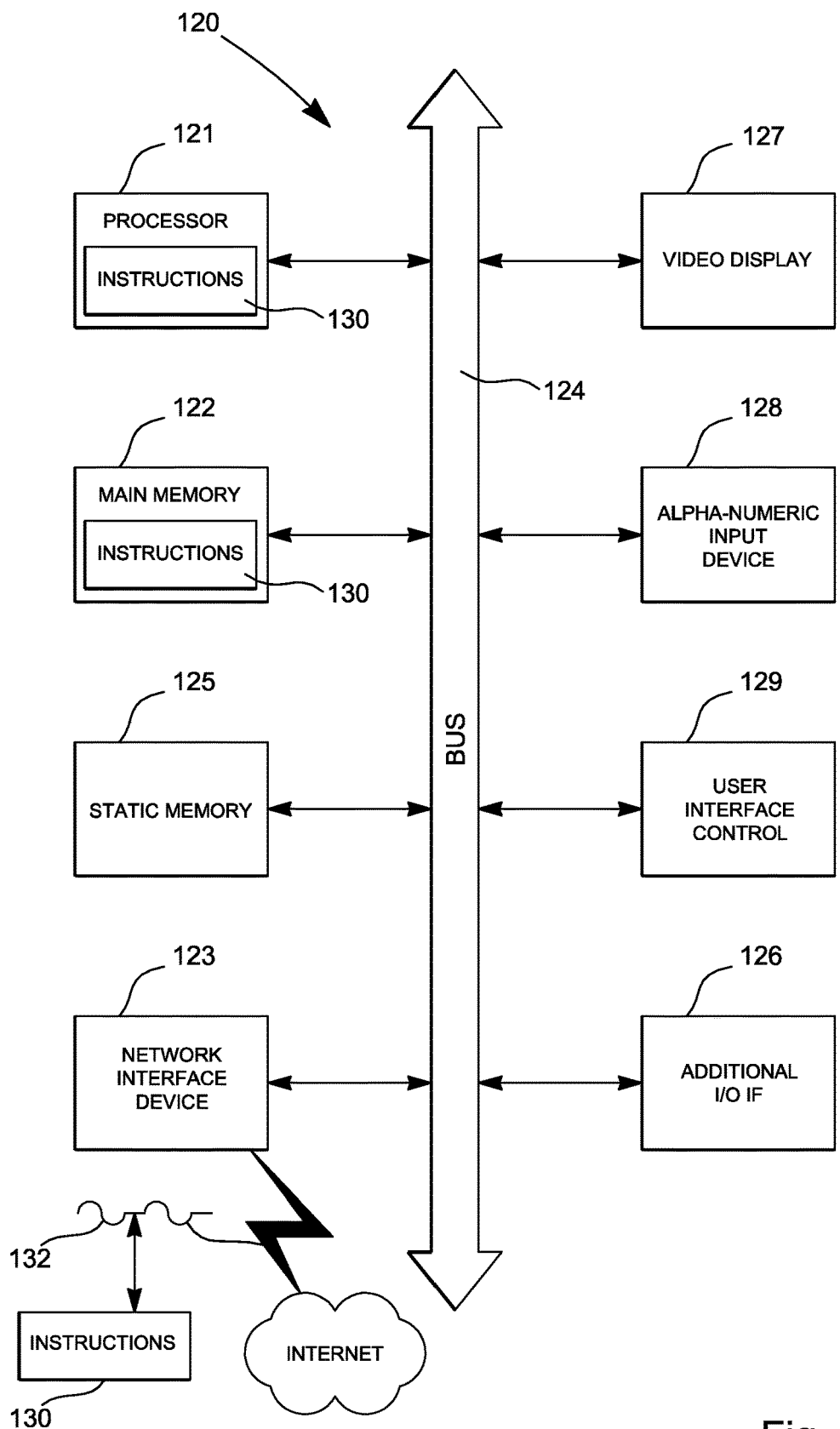
FIG. 23 is an exemplary schematic view of the internal architecture of a computer/server implementing a configuration as described herein.

Finally, FIG. 23 is a diagrammatic representation of the internal structure of a computer or server 120 which implements the product configuration mechanisms described herein. The computer or server 120 is arranged to execute a set of instructions, to cause it to perform any of the methodologies explained above. The computer or server 120 includes a processor 121, a main memory 122 and, optionally, a wireless network interface 123 (such as a Wi-Fi and/or Bluetooth interface) and/or a 2G/3G/4G mobile network interface device, all of which communicate with each other via a bus 124. It further includes a static memory 125, e.g. non-removable flash and/or solid state drive and/or a removable Micro or Mini SD card, which permanently stores the software enabling computer/server 120 to execute its functions, such as storing a product model, generating Rule BDDs, generating a DAOG, allowing a user to iteratively select values for variables in order to finish a configuration, etc., and to optionally communicate with client computers/devices within a local or wide area network via its wired and/or wireless network interface device 123. Furthermore, computer/server 120 includes a display 127, a user interface control module 129 and an alpha-numeric and cursor input device 128. Optionally, additional I/O interfaces 126 such as card reader and USB interfaces may be present. An executable set of instructions (i.e. software) 130 embodying any one, or all, of the methodologies described above, resides completely, or at least partially, permanently in the non-volatile memory 125. When being executed, respective process data resides in the main memory 122 and/or the processor 121. The software 130 may further be transmitted or received as a propagated signal 132 through the wired or wireless network interface device 123 from/to a software server within the local area network or the Internet.

Although certain products and methods constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A computer-implemented method of configuring a product for assembly based on a valid product configuration, the method comprising:
generating, by a first computer processing system in a memory of the first computer processing system, a Decomposable And Or Graph ("DAOG") representing the product model in an offline phase, wherein the product model comprises variables and rules, wherein each variable is associated with a set of values, wherein the rules represent inter-dependencies among the variables and values, and wherein the generated DAOG is transferred from the first computer processing system to a second computer processing system;
iteratively setting, by the second computer processing system by accessing the DAOG in a memory of the second computer processing system, values for the variables of the product model based on the DAOG to generate the valid product configuration based on one or more user selections received by the second computer processing system over a network, wherein the second computer processing system is an online accessible server; and
configuring, by the second computer processing system, the product for assembly based on the valid product configuration,
wherein the DAOG comprises a root node, internal nodes, and terminal nodes,
wherein the root node is either a logical conjunction operation, AND-node, or a logical disjunction operation, OR-node, each internal node is either an AND-node or an OR-node, and each terminal node is a variable-value pair that defines a variable of the product model with a value assigned to the variable,
wherein each of the variables is defined by at most one sub-branch of an AND-node such that sets of the variables associated with the sub-branches are disjunct, and
wherein
the root node is the origin of two or more edges, each of which either point to internal nodes or directly to terminal nodes,
each internal node has one or more edges pointing to it and is the origin of two or more edges, each of which either point to another internal node located closer to a terminal node or directly to a terminal node, and
each terminal node has one or more edges pointing to it.

2. The method of claim 1, further comprising:
generating Rule Binary Decision Diagrams, R-BDDs, representing the rules of the product model,
generating the DAOG on the basis of the R-BDDs by employing a BDD-based DAOG compiler.

3. The method of claim 1, wherein generating the DAOG comprises employing a recursive routine, wherein each loop of the recursive routine adds at least one additional node to the DAOG.

4. The method of claim 3, wherein the recursive routine includes a cache operation to store intermediate results of the DAOG generation.

5. The method of claim 2, wherein generating the DAOG comprises the BDD-based DAOG compiler converting the R-BDDs, wherein the conversion comprises at least one of the following activities:
   propagating unary constraints through R-BDDs,
   splitting of R-BDDs,
   merging of R-BDDs,
   synchronizing of R-BDDs,
   partitioning of R-BDDs.

6. The method of claim 1, wherein generating the DAOG comprises employing Boolean-logic based transformations on the DAOG in order to reduce the size of the DAOG.

7. The method of claim 1, wherein generating the DAOG comprises
   employing a recursive routine, wherein each loop of the recursive routine adds at least one additional node to the DAOG, and wherein the recursive routine includes a cache operation to store intermediate results of the DAOG generation,
   employing Boolean-logic based transformations on the DAOG in order to reduce the size of the DAOG, wherein Boolean-logic based transformations are employed during each loop of the recursive routine.

8. The method of claim 1, wherein the iterative setting of values for variables comprises
   setting a value for at least one variable resulting in a partial configuration,
   performing a Depth first-search along the generated DAOG, wherein the Depth-first search is employed to verify whether the partial configuration is consistent with the rules of the product model, i.e. is a valid partial configuration.

9. The method of claim 8, wherein the iterative setting of values for variables further comprises, in response to verifying that the partial configuration is valid, determining admissible variable-value pairs, i.e. variable-value pairs not being part of the valid partial configuration, which are consistent with the rules considering the valid partial configuration.

10. The method of claim 8, wherein the iterative setting of values for variables further comprises, in response to verifying that the partial configuration is valid, determining free variable-value pairs, i.e. variable-value pairs being part of the valid partial configuration, for each of which the value can be replaced by at least one alternative value, the partial configuration thereby remaining valid.

11. The method of claim 8, wherein the iterative setting of values for variables further comprises, in response to verifying that the partial configuration is valid,
   determining inadmissible variable-value pairs, i.e. variable-value pairs not being part of the valid partial configuration, which are not consistent with the rules considering the valid partial configuration,
   determining variable-value pairs of the valid partial configuration to be removed from the valid partial configuration, in order to render inadmissible variable-value pairs admissible.

12. The method of claim 8, wherein the iterative setting of values for variables further comprises, in response to verifying that the partial configuration is valid,
   determining admissible variable-value pairs, i.e. variable-value pairs not being part of the valid partial configuration, which are consistent with the rules considering the valid partial configuration,
   determining free variable-value pairs, i.e. variable-value pairs being part of the valid partial configuration, for each of which the value can be replaced by at least one alternative value, the partial configuration thereby remaining valid,
   determining inadmissible variable-value pairs, i.e. variable-value pairs not being part of the valid partial configuration, which are not consistent with the rules considering the valid partial configuration,
   determining variable-value pairs of the valid partial configuration to be removed from the valid partial configuration, in order to render inadmissible variable-value pairs admissible.

13. The method of claim 1, wherein generating the DAOG comprises
   employing a recursive routine, wherein each loop of the recursive routine adds at least one additional node to the DAOG, and wherein the recursive routine includes a cache operation to store intermediate results of the DAOG generation,
   employing Boolean-logic based transformations on the DAOG in order to reduce the size of the DAOG, wherein Boolean-logic based transformations are employed during each loop of the recursive routine,
   wherein the iterative setting of values for variables comprises
   setting a value for at least one variable resulting in a partial configuration,
   performing a Depth first-search along the generated DAOG, wherein the Depth-first search is employed to verify whether the partial configuration is consistent with the rules of the product model, i.e. is a valid partial configuration.

14. The method of claim 13, wherein the iterative setting of values for variables further comprises, in response to verifying that the partial configuration is valid,
   determining admissible variable-value pairs, i.e. variable-value pairs not being part of the valid partial configuration, which are consistent with the rules considering the valid partial configuration,
   determining free variable-value pairs, i.e. variable-value pairs being part of the valid partial configuration, for each of which the value can be replaced by at least one alternative value, the partial configuration thereby remaining valid,
   determining inadmissible variable-value pairs, i.e. variable-value pairs not being part of the valid partial configuration, which are not consistent with the rules considering the valid partial configuration,
   determining variable-value pairs of the valid partial configuration to be removed from the valid partial configuration, in order to render inadmissible variable-value pairs admissible.

15. A system for configuring a product for assembly based on a valid product configuration, the system comprising:
   a first computer processing system comprising a memory, at least one processor coupled with the memory, and program code configured to be executed by the at least one processor of the first computer processing system to cause the first computer processing system to:
   generate, in the memory, a Decomposable And Or Graph ("DAOG") representing the product model in an offline phase, wherein the product model comprises variables and rules, wherein each variable is associated with a set of values, wherein the rules represent inter-dependencies among the variables and values, and wherein the generated DAOG is transferred from the first computer processing system to a second computer processing system; and a second computer processing system comprising a memory to store the DAOG received from the first computer processing system, at least one processor coupled with the memory, and program code configured to be executed by the at least one processor of the second computer processing system to cause the second computer processing system to:

access the DAOG in the memory to iteratively set values for the variables of the product model based on the DAOG to generate the valid product configuration based on one or more user selections received by the second computer processing system over a network, wherein the second computer processing system is an online accessible server, and configure the product for assembly based on the valid product configuration;

wherein the DAOG comprises a root node, internal nodes, and terminal nodes, wherein the root node is either a logical conjunction operation, AND-node, or a logical disjunction operation, OR-node, each internal node is either an AND-node or an OR-node, and each terminal node is a variable-value pair that defines a variable of the product model with a value assigned to the variable, wherein each of the variables is defined by at most one sub-branch of an AND-node such that sets of the variables associated with the sub-branches are disjunct, and wherein the root node is the origin of two or more edges, each of which either point to internal nodes or directly to terminal nodes, each internal node has one or more edges pointing to it and is the origin of two or more edges, each of which either point to another internal node located closer to a terminal node or directly to a terminal node, and each terminal node has one or more edges pointing to it.

16. The computer system of claim 15, wherein the program code is further configured to cause the at least one processor to generate the DAOG by a recursive routine, wherein each loop of the recursive routine adds at least one additional node to the DAOG, and wherein the recursive routine includes a cache operation to store intermediate results of the DAOG generation, employ Boolean-logic based transformations on the DAOG in order to reduce the size of the DAOG, wherein Boolean-logic based transformations are employed during each loop of the recursive routine.

17. The computer system of claim 15, wherein the program code is further configured to cause the at least one processor to set a value for at least one variable resulting in a partial configuration, perform a Depth first-search along the generated DAOG, wherein the Depth-first search is employed to verify whether the partial configuration is consistent with the rules of the product model, i.e. is a valid partial configuration.

18. The computer system of claim 17, wherein the program code is further configured to cause the at least one processor to, in response to verifying that the partial configuration is valid, determine admissible variable-value pairs, i.e. variable-value pairs not being part of the valid partial configuration, which are consistent with the rules considering the valid partial configuration, determine free variable-value pairs, i.e. variable-value pairs being part of the valid partial configuration, for each of which the value can be replaced by at least one alternative value, the partial configuration thereby remaining valid, determine inadmissible variable-value pairs, i.e. variable-value pairs not being part of the valid partial configuration, which are not consistent with the rules considering the valid partial configuration, determine variable-value pairs of the valid partial configuration to be removed from the valid partial configuration, in order to render inadmissible variable-value pairs admissible.

19. A computer program product comprising a non-transitory computer readable storage medium, and program code stored on the computer readable storage medium and configured, upon execution, to cause at least one processor of at least one computer processing system to configure a product for assembly based on a valid product configuration, the program code, when executed, causing the at least one computer processing system to:

generate, in a memory of a first computer processing system, a Decomposable And Or Graph ("DAOG") representing the product model in an offline phase, wherein the product model comprises variables and rules, wherein each variable is associated with a set of values, wherein the rules represent inter-dependencies among the variables and values, and wherein the generated DAOG is transferred from the first computer processing system to a second computer processing system, access, by a second computer processing system, the DAOG in a memory of a second computer processing system to iteratively set values for the variables of the product model based on the DAOG to generate the valid product configuration based on one or more user selections received by the second computer processing system over a network, wherein the second computer processing system is an online accessible server, and configure, by the second computer processing system, the product for assembly based on the valid product configuration, wherein the DAOG comprises a root node, internal nodes, and terminal nodes, wherein the root node is either a logical conjunction operation, AND-node, or a logical disjunction operation, OR-node, each internal node is either an AND-node or an OR-node, and each terminal node is a variable-value pair that defines a variable of the product model with a value assigned to the variable, wherein each of the variables is defined by at most one sub-branch of an AND-node such that sets of the variables associated with the sub-branches are disjunct, and wherein the root node is the origin of two or more edges, each of which either point to internal nodes or directly to terminal nodes, each internal node has one or more edges pointing to it and is the origin of two or more edges, each of which either point to another internal node located closer to a terminal node or directly to a terminal node, and each terminal node has one or more edges pointing to it.

\* \* \* \* \*